(12) United States Patent
Zhang et al.

(10) Patent No.: US 10,440,553 B2
(45) Date of Patent: Oct. 8, 2019

(54) DISTRIBUTED NETWORK CENTER AND AREA ESTIMATION

(71) Applicants: Sai Zhang, Wuhan (CN); Cihan Tepedelenlioglu, Chandler, AZ (US); Andreas Spanias, Tempe, AZ (US)

(72) Inventors: Sai Zhang, Wuhan (CN); Cihan Tepedelenlioglu, Chandler, AZ (US); Andreas Spanias, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 15/995,433

(22) Filed: Jun. 1, 2018

(65) Prior Publication Data

US 2018/0352414 A1 Dec. 6, 2018

Related U.S. Application Data

(60) Provisional application No. 62/513,736, filed on Jun. 1, 2017.

(51) Int. Cl.
*H04W 8/14* (2009.01)
*H04W 84/18* (2009.01)
(Continued)

(52) U.S. Cl.
CPC ............. *H04W 8/005* (2013.01); *H04L 67/12* (2013.01); *H04W 8/14* (2013.01); *H04W 24/02* (2013.01); *H04W 4/38* (2018.02); *H04W 84/18* (2013.01)

(58) Field of Classification Search
CPC ......... H04W 84/18; H04W 4/38; H04W 8/14; H04W 8/005; H04W 52/46; H04L 67/12; H04L 29/08
See application file for complete search history.

(56) References Cited

U.S. PATENT DOCUMENTS

| 2004/0010492 A1* | 1/2004 | Zhao ..................... H04W 40/04 |
| 2012/0087272 A1* | 4/2012 | Lemkin ................. G01S 5/0289 370/252 |

(Continued)

OTHER PUBLICATIONS

Zhang, Sai et al., "Max-Consensus Using the Soft Maximum," 2013 Asilomar Conference on Signals, Systems and Computers, pp. 433-437, Nov. 3-6, 2013 (Year: 2013).*

(Continued)

*Primary Examiner* — George Eng
*Assistant Examiner* — Umair Ahsan
(74) *Attorney, Agent, or Firm* — Bryan Cave Leighton Paisner LLP

(57) ABSTRACT

Some embodiments include a wireless sensor network including a plurality of sensor nodes each comprising: a signal receiver configured to receive intermediate information from at least one of one or more neighboring nodes of the plurality of sensor nodes, one or more processors configured to receive the intermediate information and update the intermediate information based on a soft-max approximation function, and a transmitter configured to send the intermediate information, as updated, to at least one of the one or more neighboring nodes of the plurality of sensor nodes. For each sensor node of the plurality of sensor nodes: the sensor node can store local location coordinates for the sensor node, and the sensor node can be devoid of receiving location coordinates for any other of the plurality of sensor nodes. The plurality of sensor nodes can be configured to communicate in a distributed manner for a first plurality of iterations until a final iteration of the first plurality of iterations when a predetermined stopping condition is satisfied. The plurality of sensor nodes can be further configured to generate an estimated center of the wireless sensor network based on the intermediate information updated in the final iteration of the first plurality of iterations. The (Continued)

wireless sensor network can be devoid of a fusion center. Other embodiments are disclosed.

16 Claims, 12 Drawing Sheets

(51) Int. Cl.
    *H04W 4/38*     (2018.01)
    *H04W 8/00*     (2009.01)
    *H04L 29/08*     (2006.01)
    *H04W 24/02*     (2009.01)

(56) References Cited

U.S. PATENT DOCUMENTS

| | | | | |
|---|---|---|---|---|
| 2014/0274166 | A1* | 9/2014 | Zhang | G01S 5/0278 455/457 |
| 2016/0037294 | A1* | 2/2016 | Zhang | H04W 64/00 455/456.1 |

OTHER PUBLICATIONS

Iutzeler, Franck et al., "Analysis of Max-Consensus Algorithms in Wireless Channels," IEEE Transactions on Signal Processing, vol. 60, No. 11, pp. 6103-6107, Nov. 2012. (Year: 2012).*

Chen, Jianshu et al., "Diffusion Adaptation Strategies for Distributed Optimization and Learning Over Networks," IEEE Transactions on Signal Processing, vol. 60, No. 8, pp. 4289-4305, Aug. 2012.

Chrystal, G., "On the Problem to Construct the Minimum Circle Enclosing n. Given Points in a Plane," Proceedings of the Edinburgh Mathematical Society, vol. 3, pp. 30-33, Feb. 1884.

Hearn, Donald W. et al., "Efficient Algorithms for the (Weighted) Minimum Circle Problem," Operations Research, vol. 30, No. 4, pp. 777-795, Jul.-Aug. 1982.

Yu, Zuoming et al., "On Wireless Network Coverage in Bounded Areas," 2013 Proceedings IEEE INFOCOM, pp. 1195-1203, Apr. 14-19, 2013.

Vu, Chinh T. et al., "Distributed Energy-Efficient Scheduling Approach for K-Coverage in Wireless Sensor Networks," IEEE Military Communications Conference, 2006, pp. 1-7, Oct. 2006.

Greenstein, Ben et al., "Distributed Techniques for Area Computation in Sensor Networks," Proceedings of the 29th Annual IEEE International Conference on Local Computer Networks, pp. 1-9, Nov. 16-18, 2004.

Saha, Dibakar et al., "A Digital-Geometric Approach for Computing Area Coverage in Wireless Sensor Networks," Raja Natarajan (Ed.), 10th International Conference, ICDCIT 2014, Springer International Publishing Switzerland 2014, pp. 134-145, Feb. 6-9, 2014.

Guibas, Leonidas et al., "Primitives for the Manipulation of General Subdivisions and the Computation of Voronoi Diagrams," ACM Transactions on Graphics, vol. 4, No. 2, pp. 74-123, Apr. 1985.

Fortune, Steven, "A Sweepline Algorithm for Voronoi Diagrams," SCG '86 Proceedings of the Second Annual Symposium on Computational Geometry, pp. 313-322, Jun. 2-4, 1986.

Kundu, Srabani et al., "In-Network Area Estimation and Localization in Wireless Sensor Networks," GC'12 Workshop: the 7th IEEE International Workshop on Heterogeneous, Multi-Hop, Wireless and Mobile Networks, pp. 431-435, Dec. 3-7, 2012.

Chintalapudi, Krishna Kant et al., "Localized Edge Detection in Sensor Fields," Proceedings of the First IEEE International Workshop on Sensor Network Protocols and Applications, 2003, pp. 59-70, May 11, 2003.

Nowak, Robert et al., "Boundary Estimation in Sensor Networks: Theory and Methods," IPSN'03 Proceedings of the 2nd International Conference on Information Processing in Sensor Networks, pp. 80-95, Apr. 22-23, 2003.

Zhang, Sai et al., "Max-Consensus Using the Soft Maximum," 2013 Asilomar Conference on Signals, Systems and Computers, pp. 433-437, Nov. 3-6, 2013.

Nejad, Behrang Monajemi et al., "Max-Consensus in a Max-Plus Algebraic Setting: The Case of Fixed Communication Topologies," 2009 XXII International Symposium on Information, Communication and Automation Technologies, pp. 1-7, Oct. 29-31, 2009.

Iutzeler, Franck et al., "Analysis of Max-Consensus Algorithms in Wireless Channels," IEEE Transactions on Signal Processing, vol. 60, No. 11, pp. 6103-6107, Nov. 2012.

Akyildiz, I.F. et al., "Wireless Sensor Networks: A Survey," Computer Networks vol. 38, No. 4, pp. 393-422, Mar. 2002.

Tahbaz-Salehi, Alireza et al., "A One-Parameter Family of Distributed Consensus Algorithms with Boundary: From Shortest Paths to Mean Hitting Times," Proceedings of the 45th IEEE Conference on Decision & Control, pp. 4664-4669, Dec. 13-15, 2006.

Xiao, Lin et al., "Fast Linear Iterations for Distributed Averaging," Proceedings of the 42nd IEEE Conference on Decision and Control, vol. 5, pp. 4997-5002, Dec. 9-12, 2003.

Kar, Soummya et al., "Distributed Consensus Algorithms in Sensor Networks With Imperfect Communication: Link Failures and Channel Noise," IEEE Transactions on Signal Processing, vol. 57, No. 1, pp. 355-369, Jan. 2009.

Olfati-Saber, Reza et al., "Consensus Problems in Networks of Agents With Switching Topology and Time-Delays," IEEE Transactions on Automatic Control, vol. 49, No. 9, pp. 1520-1533, Sep. 2004.

Cattivelli, Federico S. et al., "Diffusion LMS Strategies for Distributed Estimation," IEEE Transactions on Signal Processing, vol. 58, No. 3, pp. 1035-1048, Mar. 2010.

\* cited by examiner

DISTRIBUTED NETWORK CENTER AND AREA ESTIMATION

CROSS-REFERENCE TO RELATED APPLICATIONS

This application claims the benefit of U.S. Provisional Application No. 62/513,736, filed Jun. 1, 2017. U.S. Provisional Application No. 62/513,736 is incorporated herein by reference in its entirety.

STATEMENT REGARDING FEDERALLY SPONSORED RESEARCH OR DEVELOPMENT

This invention was made with government support under ECSS (Extended Collaborative Support Services) 1307982 awarded by the National Science Foundation. The government has certain rights in the invention.

TECHNICAL FIELD

This disclosure relates generally to wireless sensor networks, and relates more particularly to distributed network center and area estimation.

BACKGROUND

Decentralized wireless sensor networks (WSNs) are widely used in both military and commercial applications due to the advantages of scalability and robustness to link failures. WSNs are commonly employed for many applications including for environmental protection, structural monitoring and passive localization and tracking. A wireless sensor network can include a number of sensor nodes distributed across an area of interest. These nodes can operate as transceivers, communicating with one another in an ad-hoc or coordinated manner, and can be at known locations.

BRIEF DESCRIPTION OF THE DRAWINGS

To facilitate further description of the embodiments, the following drawings are provided in which.

Figure 1:
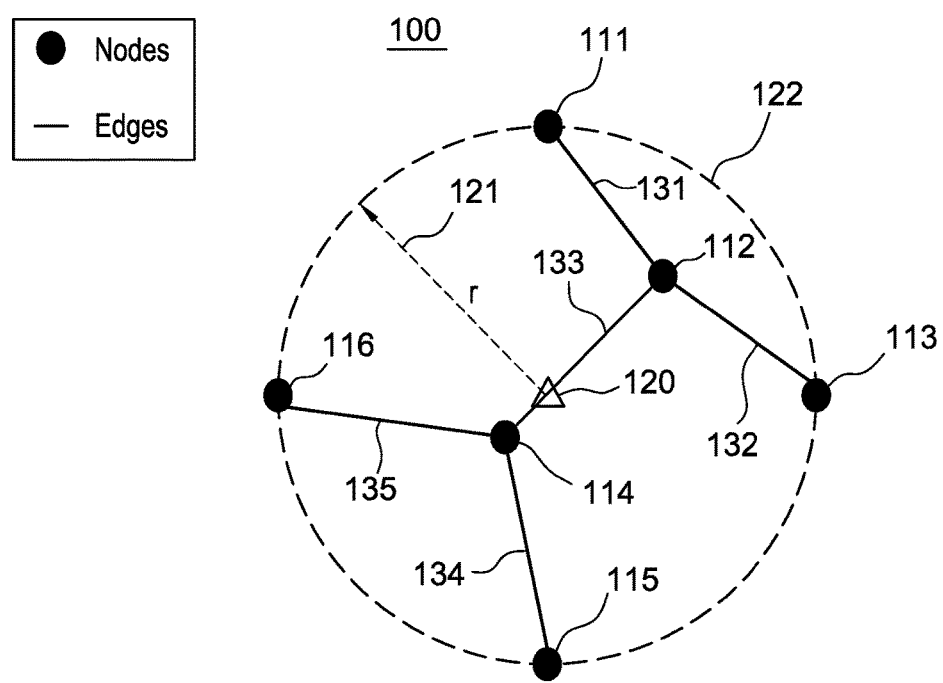
FIG. 1 illustrates a block diagram of a system that includes sensor nodes.

For simplicity and clarity of illustration, the drawing figures herein illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types. The absence of the word "removably," "removable," and the like near the word "coupled," and the like does not mean that the coupling, etc. in question is or is not removable.

DESCRIPTION OF EXAMPLES OF EMBODIMENTS

Various embodiments include a wireless sensor network. The wireless sensor network can include a plurality of sensor nodes each comprising: a signal receiver configured to receive intermediate information from at least one of one or more neighboring nodes of the plurality of sensor nodes, one or more processors configured to receive the intermediate information and update the intermediate information based on a soft-max approximation function, and a transmitter configured to send the intermediate information, as updated, to at least one of the one or more neighboring nodes of the plurality of sensor nodes. For each sensor node of the plurality of sensor nodes: the sensor node can store local location coordinates for the sensor node, and the sensor node can be devoid of receiving location coordinates for any other of the plurality of sensor nodes. The plurality of sensor nodes can be configured to communicate in a distributed manner for a first plurality of iterations until a final iteration of the first plurality of iterations when a predetermined stopping condition is satisfied. The plurality of sensor nodes can be further configured to generate an estimated center of the wireless sensor network based on the intermediate information updated in the final iteration of the first plurality of iterations. The wireless sensor network can be devoid of a fusion center.

A number of embodiments include a method. The method can include communicating in a distributed manner among a plurality of sensor nodes of a wireless sensor network for a first plurality of iterations until a final iteration of the first plurality of iterations when a predetermined stopping condition is satisfied. Each of the plurality of sensor nodes can include a signal receiver configured to receive intermediate information from at least one of one or more neighboring nodes of the plurality of sensor nodes, one or more processors configured to receive the intermediate information and update the intermediate information based on a soft-max approximation function, and a transmitter configured to send the intermediate information, as updated, to at least one of the one or more neighboring nodes of the plurality of sensor nodes. The method also can include generating an estimated center of the wireless sensor network based on the intermediate information updated in the final iteration. For each sensor node of the plurality of sensor nodes: the sensor node can store local location coordinates for the sensor node, and the sensor node can be devoid of receiving location coordinates for any other of the plurality of sensor nodes. The wireless sensor network can be devoid of a fusion center.

In many embodiments, the nodes of the decentralized WSN can estimate the center and coverage region of the decentralized WSN. Estimating the center and area of a WSN can be useful in various applications, such as localizing a service center in the network, which can facilitate placing a fusion center in a centralized network, and border detection and control, for example.

The knowledge of the area of the WSN and the total number of nodes in the network can be used to decide the optimal connection between sensor nodes. The required power at sensor nodes also depends on the area of the network. Moreover, energy-efficient scheduling in a WSN depends on the coverage area of the network. However, it is often hard to estimate the network center and area in a distributed WSN where sensor nodes only have local information.

In a number of embodiments, the estimation can be based on the assumption that the network area is a circle in the case of a two-dimensional (2-D) WSN, or a sphere in the case of a three-dimensional (3-D). In many embodiments, the center and radius of the network area can be estimated in a fully distributed manner. FIG. 1 illustrates a block diagram of a system 100, which can include sensor nodes 111, 112, 113, 114, 115, and 116, which are also referred to as simply "nodes." System 100 is merely exemplary, and embodiments of the system are not limited to the embodiments presented herein. The system can be employed in many different embodiments or examples not specifically depicted or described herein. As shown in FIG. 1, system 100 can be a distributed WSN in a two-dimensional configuration with a total number of nodes (N) of 6 (i.e., N=6), namely sensor nodes 111-116. A center 120 of the network provided by system 100 is represented by a delta ($\Delta$) in FIG. 1. A radius 121 of the network provided by system 100 is represented by "r" in FIG. 1. A dashed circle 122 is used in FIG. 1 to represent the area of the network provided by system 100. FIG. 1 also includes edges, such as edges 131, 132, 133, 134, and 135, between the sensor nodes (e.g., 111-116), which depict neighboring pairs of sensor nodes in which local communications can occur in the distributed WSN of system 100.

Estimating the network area in wireless sensor networks has been attempted in a distributed area computation by using Delaunay triangulations, Voronoi diagrams, inverse neighborhood and inverse neighborhood with location. Delaunay triangulations and Voronoi diagrams require that sensor nodes know their locations, and both methods partition the space into disjoint sectors. The coverage area of the sensor network is then computed by summing all sector areas. However, the computational complexity of these two partition methods is very high. Two new, simpler algorithms, i.e., the inverse neighborhood and the inverse neighborhood with location methods, have been proposed. The reduced complexity methods, however, assume that a node can estimate its coverage area and that all neighboring nodes are known. In that case, the area for which it is responsible is calculated by dividing the coverage area by total number of neighbors plus one and the total area can be calculated by summing all subareas.

A distributed algorithm named AEL (area estimation and localization) algorithm has been proposed for network area estimation and network center localization. In that AEL algorithm, it is assumed that a spanning tree exists in the network, and the nodes know their own locations and the IDs of their parent and child nodes. It is assumed that an event occurs in the network region at the beginning of the algorithm. The nodes sense the event to determine whether they are affected or not. The nodes then iteratively gather information from the child nodes to estimate the center. Finally, a sink node computes the estimated center and the radius of the network. The AEL algorithm is simple in terms of computation but underestimates the network area. Moreover, performance of AEL algorithm depends somewhat on the node degrees. The algorithm is designed based on the assumption that a spanning tree exists in the network, and nodes know their own locations and the IDs of their parent and child nodes.

A wireless sensor network coverage area estimation approach based on a digital circle method has also been proposed. In that approach, it is assumed that each node covers a circular region with uniform radius on a 2-D plane. Digital circles are used to represent the real circle to quantify the coverage area for each node. A method for computing the area of the digital circles is proposed to compute the total coverage area or coverage region of the network. Centralized and distributed approaches are both considered. Other approaches also consider algorithms for estimating the boundary of the network region.

Other proposed approaches consider the problem of finding the smallest circle or sphere that contains all sensor nodes or data points. For example, the minimum covering circle problem for computing the smallest circle contains all of a given set of points has been attempted. For example, one proposal assumes that the location information of all nodes is available. The minimum circle is obtained by constructing a large circle with two points on boundary and repeatedly shrinking the circle with different boundary points. Still other approaches attempt to design efficient algorithms for the minimum circle problem. For example, in one approach, the center is defined as a minimax problem (i.e., minimizing the possible loss for a worst case (maximum loss) scenario), and converted to a constrained primal problem and a dual problem. Algorithms using different approaches such as feasible direction algorithm and dual feasible algorithm have been proposed. Further, weighted minimum circle problem have also been considered, in which the weights are different on the distances from nodes (existing points) to the center.

In many embodiments, the system and methods described herein can advantageously estimate the network center and coverage region in a fully distributed network. In several embodiments, the systems and methods described herein can beneficially assume that the nodes only know their own location, and not the locations of other nodes. In a number of embodiments, the coverage region of the network can be defined to be the smallest sphere that covers all sensor nodes. In several embodiments, the systems and methods described herein can advantageously estimate the network center and radius.

In various embodiments, the systems and methods described herein can perform a fully distributed algorithm for estimating the center and the coverage area of a WSN, such as system 100 shown in FIG. 1. For example, the center (e.g., 120) and radius (e.g., 121) of the network area (e.g., shown within dashed circle 122) can be estimated in a fully distributed manner using only local communication between neighboring nodes, without a centralized fusion center for the WSN. It can be assumed that the sensor nodes (e.g., 111-116) are aware of their own locations, and the coverage area of the network can be assumed to be circular in the 2-D case and spherical for the 3-D case. The center (e.g., 120) and radius (e.g., 121) of the network area (e.g., shown within dashed circle 122) can be estimated to characterize the network coverage area. In many embodiments, the systems and methods described herein can use a soft-max approximation and can formulate network center estimation as a convex optimization problem. The distributed max (i.e., maximum) consensus can be used to estimate the radius of the network area.

In many embodiments, the systems and methods described herein can be addressed the problem of localizing the center and estimating the coverage area of a distributed WSN, such as system 100. The center and coverage area of a WSN can be useful in many applications. For example, knowledge of the area of the wireless sensor network and the total number of nodes in the network can be used to decide the optimal connection between sensor nodes. The power used at sensor nodes also depends on the area of the network. Moreover, energy-efficient scheduling in a WSN can depend on the coverage area of the network. However, it is often difficult to estimate the network center and area in a distributed WSN where sensors only have local information. In many embodiments, two nodes can communicate with each other only if they are neighbors, as represented by edges 131-135 in FIG. 1.

In a number of embodiments, the network center estimation problem can be formulated as an optimization problem. By rewriting the objective function using soft-max approximation, the problem can be turned into a convex optimization problem with a summation form. Therefore, the stochastic gradient descent method can be used to solve the convex optimization problem in a distributed manner. It can be shown that the algorithm converges to an estimate of the center of the network. Max consensus can be used to estimate the radius and the network area is obtained at all nodes. The algorithm performed by the systems and methods described herein can be fully distributed and such that nodes do not need to be labeled.

In other embodiments, a soft-max approximation with a log-sum-exponential function can be used to formulate the center estimation problem as a convex optimization problem in the form of a sum of differentiable local functions. Diffusion adaptation can then be used to solve the convex optimization problem distributively. Max consensus can then be used to estimate the radius. In many embodiments, there can be a trade-off between estimation accuracy and convergence speed, in which a larger soft-max design parameter, ft, can result in the center estimation being more accurate, but also can results in slower convergence. In many embodiments, using the diffusion adaptation method can result in faster center estimation than using stochastic gradient descent, but using the diffusion adaptation method can be more complex by involving simultaneous communications between various nodes.

In several embodiments, the systems and methods described herein can beneficially converge to an accurate estimate of the center and radius of the network when a design parameter is chosen to be large, unlike Delaunay triangulations and Voronoi diagrams methods which require a large connectivity radius for accurate area estimation. In some embodiments, the systems and methods described herein can involve a longer time for convergence than the AEL algorithm, but can provide more accurate center estimation. In several embodiments, the systems and methods described herein can define the network area to be smallest circle that covers all the sensor nodes, instead of defining the coverage area to be the total sensing region.

In many embodiments, the distributed network, such as system 100, can be modeled as an undirected connected graph $\mathbb{G} = (\mathbb{N}, \mathbb{E})$ containing a set of nodes $\mathbb{N} = \{1, \ldots, N\}$, such as sensor nodes 111-116, and a set of edges $\mathbb{E}$, such as edges 131-135. Two nodes can communicate with each other only if they are neighbors. The set of neighbors of node i is denoted by $\mathbb{N}_i$, i.e., $\mathbb{N}_i = \{j | \{i,j\} \in \mathbb{E}\}$. The number of neighbors of node i is $d_i$. A diagonal matrix, named degree matrix, D diag[$d_1, d_2, \ldots, d_N$], can be used to contain the degrees of nodes. The connectivity structure of the graph can be characterized by the adjacency matrix $A = \{a_{ij}\}$ such that $a_{ij}=1$ if $\{i, j\} \in \mathbb{E}$ and $a_{ij}=0$ otherwise. The Laplacian matrix L is defined as L=D−A.

The soft-max function can be used to approximate the maximum. The soft maximum of a vector $\theta = [\theta_1 \theta_2 \ldots \theta_N]$ is denoted as $$\text{smax}(\theta) = \frac{1}{\beta} \log \sum_{i=1}^{N} e^{\beta \theta_i} \quad (1)$$

where $\beta > 0$ can be a design parameter, and the soft-max can approximate the maximum for large $\beta$. The soft-max in equation (1) is larger than the maximum value of $\theta$. The difference is small when $\beta$ is large:

$$\max(\theta) \leq \text{smax}(\theta) \leq \max(\theta) + \frac{1}{\beta} \log N \quad (2)$$

Stochastic gradient descent can be used as an approximation of the traditional gradient descent optimization. If the objective function can be written as a summation of differentiable functions:

$$J(\omega) = \sum_{i=1}^{N} Q_i(\omega), \quad (3)$$

where the parameter $\omega$ that minimizes $J(\omega)$ is to be estimated. Then the gradient in the standard gradient descent, $\nabla J(\omega)$ can be approximated by a single gradient term, $\nabla Q_i(\omega)$. The iterative updating rule for stochastic gradient descent can be expressed as $$\omega := \omega - \eta \nabla Q_i(\omega) \quad (4)$$

where $\eta$ is the step size.

In max consensus, it can be desired that nodes converge to the maximum of the initial values. The updating rule can be set that the nodes update their states with the largest received measurement they receive in each iteration. Let $r_i(t)$ be the state of node i at time t, such that the updating rule can be expressed as $$r_i(t+1) = \max \left\{ \begin{array}{c} r_i(t), \max_{j} r_j(t) \\ j \in N_i \end{array} \right\}. \quad (5)$$

By running the iterative algorithm, states of nodes can converge to the maximum of the initial states in finite time.

In many embodiments, the system can include a distributed wireless sensor network without a fusion center. Each node in the network can know its own location, but not the location of the other nodes in the network. Each node can keep a single state and the nodes can update their states by exchanging their states with their neighbors. The network area can be defined to be a circular region in the 2-D case and a sphere shape region in the 3-D case. Estimating the area of a network can thus involve locating the center, such as center 120 in FIG. 1, and calculating the radius, such as radius 121 in FIG. 1.

In many embodiments, a soft-max approximation can be used to formulate the center estimation problem as a convex optimization problem. The object function can be written as a summation of differentiable functions using the soft-max function and the stochastic gradient descent can be used for distributed optimization to estimate the center. After all nodes obtain the estimate of the center, such as center 120 in FIG. 1, max consensus can be used for distributed radius calculation, which can allow the network area to be estimated at the nodes.

Centralized Area Estimation

A centralized area estimation algorithm can be performed as two phases: the center of the circle or sphere can be estimated in Phase I, and the radius can be calculated in Phase II.

Phase I: Centralized Center Estimation

Phase I of the algorithm can find a center O of the network, in which the center O minimizes the maximum distance between O and all nodes. In a 2-D distributed WSN, each sensor node can know its own location, but not the locations of the other nodes, and the location of node i is $(a_i, b_i)$. The network center can be at location $O(x, y)$, such that the radius, r, which is the maximum distance between nodes and the center can be calculated as $r = \sqrt{(a_i - x)^2 + (b_i - y)^2}$. Because the area of the smallest covering circle is proportional to $r^2$, the center location can be obtained by solving the following optimization problem:

$$\text{minimize}_{x,y} \max_i \{(a_i - x)^2 + (b_i - y)^2\}, \quad (6)$$

where $(a_i, b_i)$ is the location of node i and the location of the center $O(x, y)$ minimizes equation (6). In 3-D case, the optimization problem can be written as $$\text{minimize}_{x,y,z} \max_i \{(a_i - x)^2 + (b_i - y)^2 + (c_i - z)^2\}, \quad (7)$$

where $(a_i, b_i, c_i)$ is the location of node i and the location of the center $O(x, y, z)$ minimizes equation (7). The formulation in Equations (6) and (7) can be extended to higher dimension cases such as 4-D. The 2-D case is described herein, and the algorithm for the 3-D case is similar.

The objective function in Equation (6) cannot be solved in that form in a distributed network in which the nodes only have local information. Moreover, the objective function in Equation (6) is neither differentiable nor convex. The soft-max approximation can be used to reformulate Equation (6) as the following optimization problem:

$$\text{minimize}_{x,y} \log \left[ \sum_{i=1}^{N} e^{\beta \{(a_i - x)^2 + (b_i - y)^2\}} \right]. \quad (8)$$

$\beta$ can be a design parameter that is predetermined based on the type of application in which the network is used, by considering trade-offs between how much accuracy and speed is desired. When $\beta$ is larger, the approximation is more accurate, but takes more time. When $\beta \to \infty$ in Equation (8), Equation (8) becomes Equation (6). Equation (8) can be further simplified because since log(•) is a monotonic increasing function, yielding:

$$\text{minimize}_{x,y} \left[ \sum_{i=1}^{N} e^{\beta\{(a_i-x)^2+(b_i-y)^2\}} \right]. \tag{9}$$

The objective function in Equation (9) is differentiable and convex.

The gradient descent method can be applied to solve Equation (9) to estimate the center. The proof of convexity of Equation (9) can be obtained by first calculating the Hessian of the objective function in (9). Then the Hessian matrix can be shown to be positive definite when $\beta > 0$. Let $$J(x, y) = \sum_{i=1}^{N} e^{\beta\{(a_i-x)^2+(b_i-y)^2\}}. \tag{10}$$

Based on Equation 10, application of the gradient descent for estimating the center is described below in pseudo-code in Algorithm 1.

---
Algorithm 1 Gradient descent method for center calculation
---
given starting values $(x^{(0)}, y^{(0)})$
Repeat $$x^{(t+1)} = x^{(t)} - \eta \frac{\partial}{\partial_{x^{(t)}}} J(x^{(t)}, y^{(t)}).$$

$$y^{(t+1)} = y^{(t)} - \eta \frac{\partial}{\partial_{y^{(t)}}} J(x^{(t)}, y^{(t)}).$$

until stopping criterion is satisfied.

---

$x^{(t)}$ can represent the update of the x value at iteration time t. When t is large, the values of $(x, y)$ can converge to the values $(x^*, y^*)$ that minimize Equation (9). The result can be an accurate estimate of the center of the network area when the value of $\beta$ is large. The stopping criterion in Algorithm 1 can be of the form $\|\nabla J(\bullet)\|_2 \geq \rho$, where $\rho > 0$ is small. The stopping criteria for convergence can be when the values are stable (e.g., within a predetermined delta) across the nodes for a predetermined amount of time, or after a predetermined amount of time or amount of iterations.

Phase II: Centralized Radius Estimation

Let $(x^*, y^*)$ be the solution of Equation (9), which is the estimated center. In Phase II of the algorithm for centralized area estimation, the radius of the network can be obtained by calculating the maximum distance between the estimated center $(x^*, y^*)$ and nodes, as follows:

$$r = \max_{i} \sqrt{(a_i - x^*)^2 + (b_i - y^*)^2} \tag{11}$$

By knowing the center and radius, the network area can be obtained.

Distributed Area Estimation

In wireless sensor networks in which nodes have limited power and storage, distributed algorithms can beneficially conserve resources. In some embodiments, a wireless sensor network can perform distributed area estimation. In some embodiments, stochastic gradient descent can be used to estimate the center in a fully distributed way in Phase I. In other embodiments, diffusion adaptation can be used to estimate the center in a fully distributed way in Phase I. In many embodiments, max consensus can be used to compute the radius of the network in Phase II.

Phase I: Distributed Center Estimation

Stochastic Gradient Descent

In some embodiments, the nodes in the wireless sensor network can estimate the center in a distributed manner using stochastic gradient descent. By using the soft-max approximation, the network center estimation problem can be formulated as the convex optimization problem described in Equation (9). Because the objective function in Equation (9) is a sum of differentiable functions, stochastic gradient descent can be used to solve the convex optimization problem in a fully distributed way. At each node, the true gradient $\nabla J(x^{(t)}, y^{(t)})$ is approximated by the local gradient $\nabla Q_i (x_i^{(t)}, y_i^{(t)})$ where $$Q_i(x_i^{(t)}, y_i^{(t)}) = e^{\beta\{(a_i-x_i^{(t)})^2+(b_i-y_i^{(t)})^2\}}. \tag{12}$$

Algorithm 2 below describes pseudo-code for the updating steps at the nodes. First, a leader can be selected as the starting node with starting value) $(x^{(0)}, y^{(0)})$. The leader can update its estimate using the stochastic gradient descent method, randomly choose one of its neighboring nodes, and pass the estimate to that neighboring node. The neighboring node that receives the data then becomes an active node, and the original leader turns inactive. The active nodes then repeat doing the update: (i) update the estimate of center $(x^{(t)}, y^{(t)})$ by using stochastic gradient descent, and randomly choose one neighbor node to pass the estimate to; and (ii) after passing the data, the original source node returns inactive, and the neighboring node that receives the data becomes active. At each iteration time, there is only one active node active in the network doing the update, and all the inactive nodes stay idle. Finally, when t is large, all nodes reach consensus on the estimated center.

Algorithm 2 performs like a sequential stochastic gradient descent, and it is fully distributed in the sense that the update of $x_i^{(t+1)}$ and $y_i^{(t+1)}$ at node i only depends on its own location information $(a_i, b_i)$ and received data $(x_i^{(t)}, y_i^{(t)})$. In some embodiments, max consensus can be used for distributed leader selection (e.g., choose the starting node) at the beginning of Algorithm 2.

---
Algorithm 2 Stochastic gradient descent for center calculation
---
select a leader node (active node), with starting values $(x^{(0)}, y^{(0)})$.
for active node i:
  repeat $$x_i^{(t+1)} = x_i^{(t)} - \eta \frac{\partial}{\partial_{x_i^{(t)}}} Q_i(x_i^{(t)}, y_i^{(t)}).$$

$$y_i^{(t+1)} = y_i^{(t)} - \eta \frac{\partial}{\partial_{y_i^{(t)}}} Q_i(x_i^{(t)}, y_i^{(t)}).$$

-continued

Algorithm 2 Stochastic gradient descent for center calculation select a neighbor $j \in \mathcal{N}_i$ to pass data:
$x_j^{(t+1)} = x_i^{(t+1)}$, $y_j^{(t+1)} = y_i^{(t+1)}$.
node i → inactive, node j → active
until stopping criterion is satisfied.

Diffusion Adaptation

In other embodiments, diffusion adaptation can be used to solve Equation (9). Because the objective function in Equation (9) is written as a sum of differentiable local convex functions, diffusion adaptation can be used to solve the convex optimization problem in Equation (9) distributively. Let $\omega_i(t) = [x_i(t) \, y_i(t)]^T$, $J_j(\omega_i(t)) = e^{\beta\{(a_j - x_i(t))^2 + (b_j - y_i(t))^2\}}$ be the local objective function at node i, and $\psi_i^{(t)} \in \mathbb{R}^2$ be an intermediate value vector. In many embodiments, the following iterative algorithm can be used:

$$\psi_i(t+1) = \omega_i(t) - \mu \sum_{j \in \mathbb{N}_i} c_{j,i} \nabla_\omega J_j(\omega_i(t)), \tag{13}$$

$$\omega_i(t+1) = \sum_{j \in \mathbb{N}_i} a_{j,i} \psi_i(t+1), \tag{14}$$

where $\mu > 0$ is a small constant descent step size parameter. In several embodiments, $c_{j,i}$ and $a_{j,i}$ can be non-negative coefficients that satisfy $$\sum_{i=1}^{N} c_{j,i} = 1, c_{j,i} = 0, \sum_{i=1}^{N} a_{j,i} = 1, a_{j,i} = 0, \tag{15}$$

if $j \notin \mathbb{N}_i$, $j = 1, 2, \ldots, N$

By running the iterative algorithm in Equations (13) and (14), estimates at nodes $\omega_i^{(t)}$ can converge towards the solution of Equation (9). In such embodiments, the estimated center can thus be obtained at the sensor nodes.

Phase II: Distributed Radius Estimation

In many embodiments, after consensus is reached and all nodes in the network have an estimate of the center, (x*, y*), max consensus can be used to estimate the radius distributively. Let (x*, y*) be the consensus after running stochastic gradient descent in Algorithm 2, for the embodiments in which that approach is used. Let $\omega_i^* = [x_i^* y_i^*]^T$ be the consensus result at node i after running the diffusion adaptation in Equations (13) and (14), for the embodiments in which that approach is used. The initial state of node i, denoted as $r_i(0)$ is set to be the distance to the estimated center, so that $$r_i(0) = \sqrt{(a_i - x^*)^2 + (b_i - y^*)^2} \tag{16}$$

In several embodiments, max consensus can be used, such that the nodes update their states with the largest measurement they receive in each iteration. The update of node i at time (t+1) can be expressed as $$r_i(t+1) = \max\left\{r_i(t), \max_{j \in \mathbb{N}_i} r_j(t)\right\} \tag{17}$$

In many embodiments, $r_i(t)$ can converge to an estimate of the radius (maximum of the initial states), as this process can be achieved in finite time. By knowing the network center and radius, an estimate of the network coverage region can thus be obtained at each of the nodes in the WSN. The algorithm can be similarly extended to 3-D WSNs.

Performance Analysis

The performance can be affected by the design parameters. Because soft-max approximation is used, larger β values can result in more accurate max approximation from Equation (1) to Equation (3). Therefore, more accurate network center estimates can be obtained at nodes when β is chosen to be large.

However, larger β also results in slower convergence. Let $\omega^* = [x^* y^*]^T$ be the optimal solution for Equation (3). $\in(t)$ can be defined to be the maximum mean square error (MSE) among all sensor nodes at time, such that $\in(t) = \max_i E[\|\omega_i(t) - \omega^*\|^2]t$. An upper bound on the MSE can be calculated as $$\epsilon(t) \leq \left(\max_i \gamma_i^2\right)^t \epsilon(0), \tag{18}$$

where $$\gamma_i = \max\left\{\left|1 - \mu \sum_{j=1}^{N} c_{j,i} \lambda_{j,max}\right|, \left|1 - \mu \sum_{j=1}^{N} c_{j,i} \lambda_{j,min}\right|\right\}, \tag{19}$$

and $\lambda_{j,max}$ and $\lambda_{j,min}$ are non-negative real numbers such that for all ω:

$$\lambda_{j,min} I \leq \nabla_\omega^2 J_j(\omega) \leq \lambda_{j,max} I. \tag{20}$$

Equation (18) shows that states of nodes converge geometrically to the optimal point for small enough μ. It can be proven that $\lambda_{j,min} = 2\beta$, while the value for $\lambda_{j,max}$ increases as β increases. Therefore, for larger β, μ can be made small to make $(\max_i \gamma_i^2) < 1$ to ensure convergence. However, smaller μ results in larger $\gamma_i$ value (close to 1) as shown in equation (19), which makes the convergence slower.

Therefore, the following trade-off can be considered in the choice of design parameters: a more accurate center estimate can be obtained when β is chosen to be large, however larger β also results in slower convergence speed. The convergence speed of the distributed center estimation algorithm also depends on the step size μ, the initial starting state ($x_i(0)$, $y_i(0)$), $c_{j,i}$ and $a_{j,i}$ as shown in Equations (18) and (19).

Simulation Results

Figure 2:
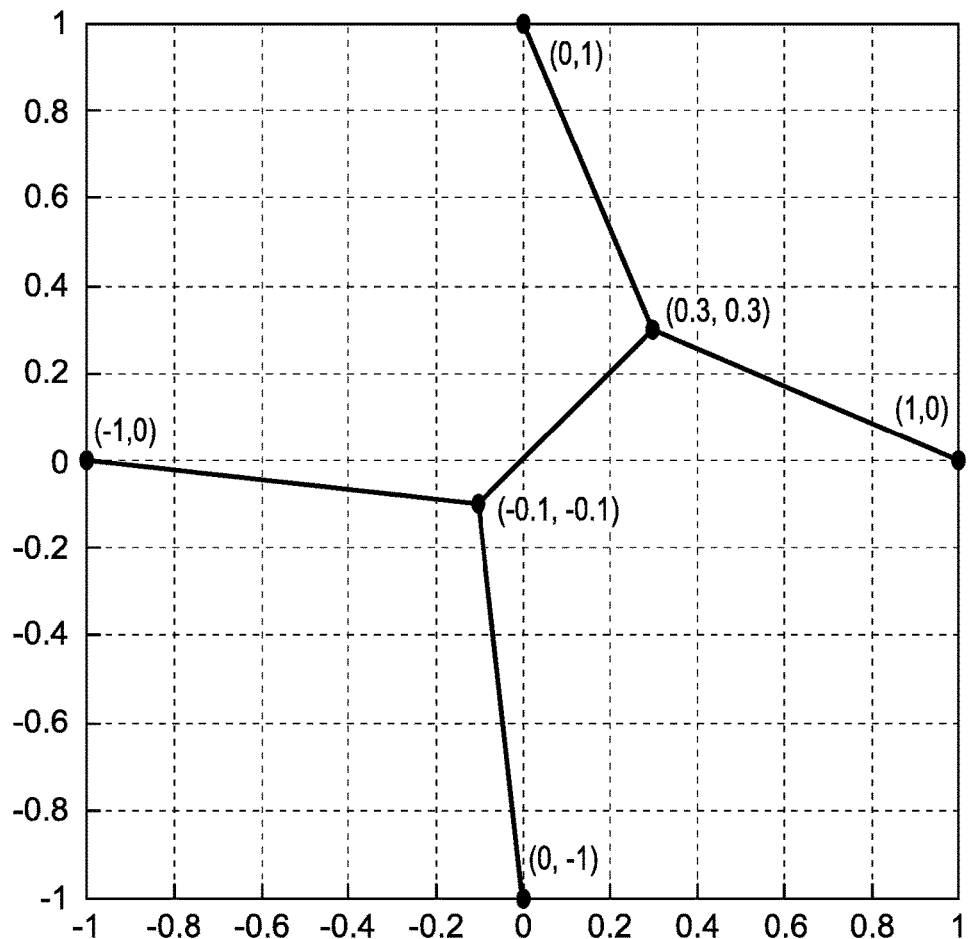
FIG. 2 illustrates a graphical representation of the system of FIG. 1 on a 2-D Cartesian coordinate system.

Simulations of the systems and methods presented herein have been performed. FIG. 2 illustrates a graphical representation of system 100 (FIG. 1) on a 2-D Cartesian coordinate system. Specifically, a 2-D connected graph with N=6 nodes is generated as shown in FIG. 2. The locations of the nodes, which correspond to sensor nodes 111-116 (FIG. 1), are shown in FIG. 2. The center of the network is at O(0,0) and the radius r=1.

Figure 3A:
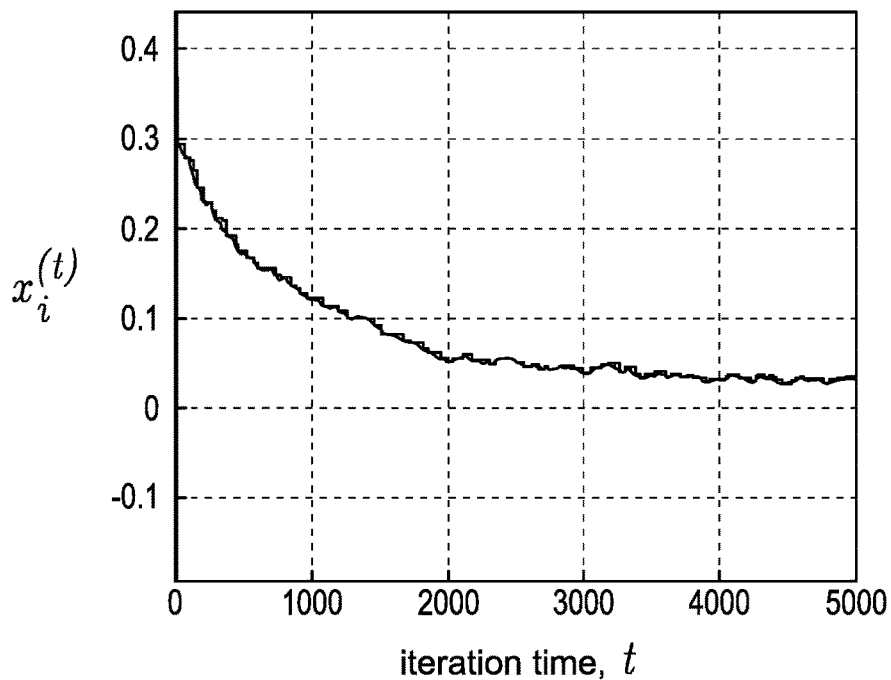
FIG. 3A illustrates a graphical plot of the estimate of the x coordinate value of the center $x_i^{(t)}$ at all of the nodes i of the system of FIGS. 1-2 versus iteration t when performing distributed center estimation using the stochastic gradient descent approach, with $x_i^{(0)}$=0.3.
Figure 3B:
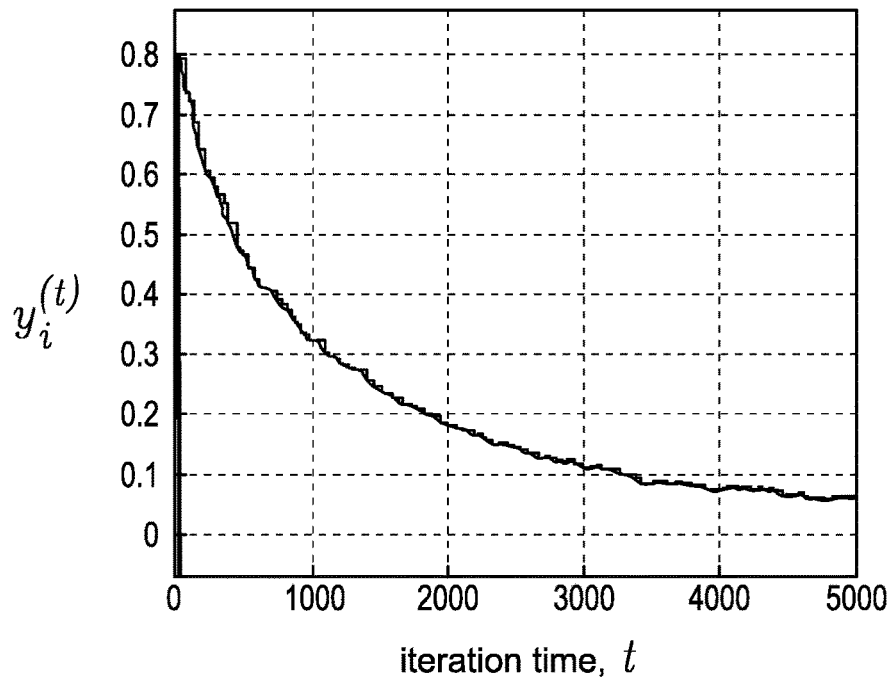
FIG. 3B illustrates a graphical plot of the estimate of the y coordinate value of the center $y_i^{(t)}$ at all of the nodes i of the system of FIGS. 1-2 versus iteration t when performing distributed center estimation using the stochastic gradient descent approach, with $y_i^{(0)}$=0.8.
Figure 4:
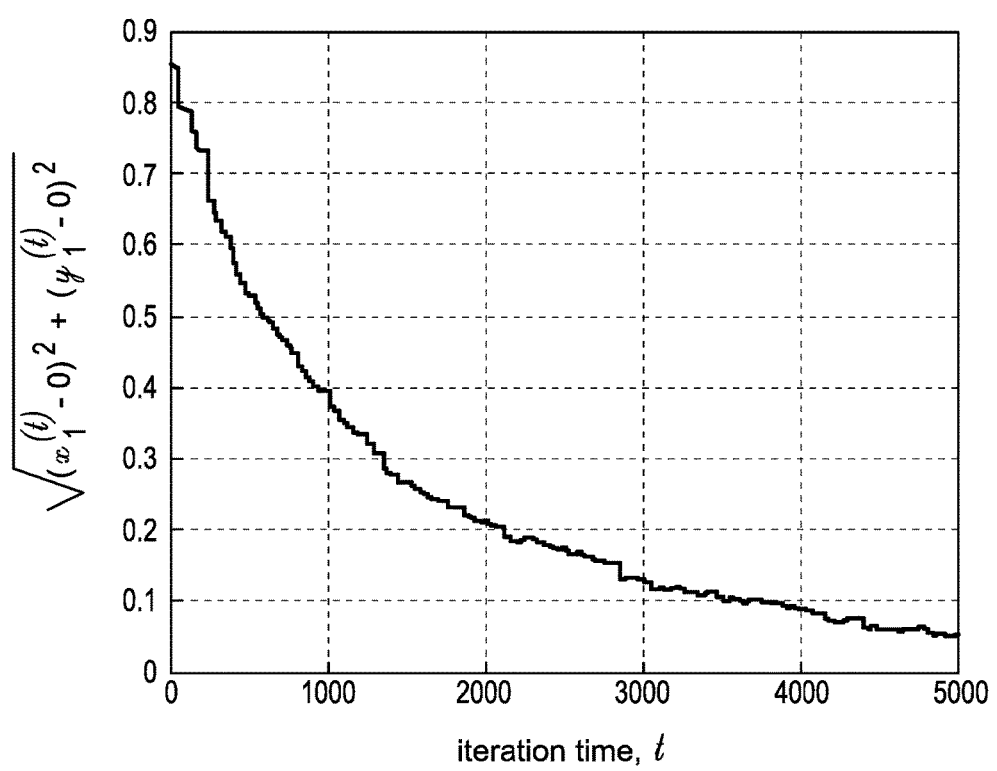
FIG. 4 illustrates a graphical plot of the error between the actual center O and the estimated center at node 1 when using the stochastic gradient descent on the system of FIGS. 1-2.

FIGS. 3A, 3B, and 4 illustrate results when performing distributed center estimation using the stochastic gradient descent approach described above in Algorithm 2 on the system shown in FIGS. 1 and 2. Node 1 (location at (1,0), corresponding to sensor node 113 (FIG. 1)), is set to be the starting node with starting values of (0.3,0.8). The stochastic gradient descent step size $\eta = 10^{-4}$ and the soft-max parameter β=1. Specifically, FIG. 3A illustrates a graphical plot of the estimate of the x coordinate value of the center $x_i^{(t)}$ at all of the nodes i versus iteration t when performing distributed center estimation using the stochastic gradient descent approach, with $x_i^{(0)}=0.3$. FIG. 3B illustrates a graphical plot of the estimate of the y coordinate value of the center $y_i^{(t)}$ at all of the nodes i versus iteration t when performing distributed center estimation using the stochastic gradient descent approach, with $y_i^{(0)}=0.8$. Together, FIGS. 3A and 3B show the estimated coordinates of the center O at all the nodes. The results in FIGS. 3A and 3B show that the estimates at the nodes converge towards the center of the network when iteration time t is large.

FIG. 4 illustrates a graphical plot of the error between the actual center O and the estimated center at node 1 when using the stochastic gradient descent approach described above in Algorithm 2 on the system in FIGS. 1-2. The actual center is denoted as $\sqrt{(x_1^{(t)}-x_O)^2+(y_1^{(t)}-y_O)^2}$, where $(x_O, y_O)=(0,0)$ is the actual center. The results in FIG. 4 show that the error decreases as iteration time t increases and the estimate converge towards the center.

Figure 5:
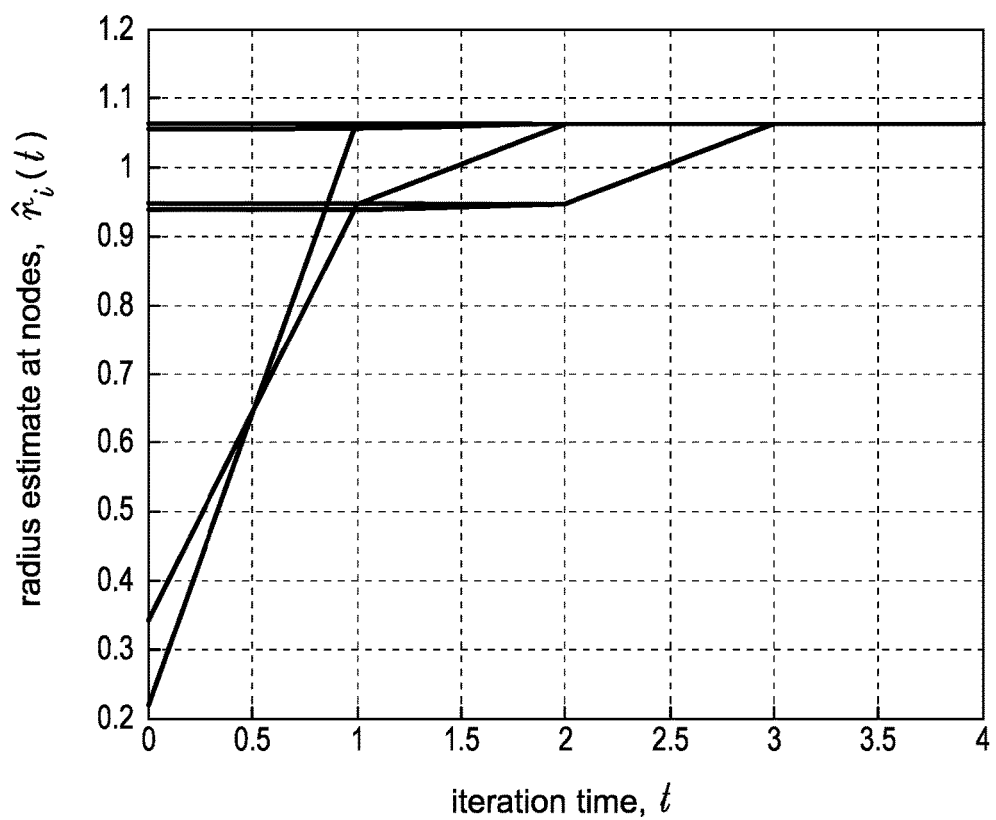
FIG. 5 illustrates a graphical plot of the radius estimate $\hat{r}_i(t)$ versus iteration t when performing the max consensus for radius estimation at all of the nodes i of the system of FIGS. 1-2.

FIG. 5 illustrates a graphical plot of the radius estimate $\hat{r}_i(t)$ versus iteration t when performing the max consensus for radius estimation at all of the nodes i, which is described in Phase II of the distributed area estimation algorithm described above. Distances from the nodes to the estimated centers are calculated at the nodes and set as initial values at the nodes for max consensus. The initial value of node i is set to be the distance between the estimated center and its own location. FIG. 5 shows the process of performing max consensus radius estimation. Specifically, FIG. 5 shows that consensus is reached across the nodes in 3 iterations, and the estimated radius $\hat{r}=1.063$.

Figure 6:
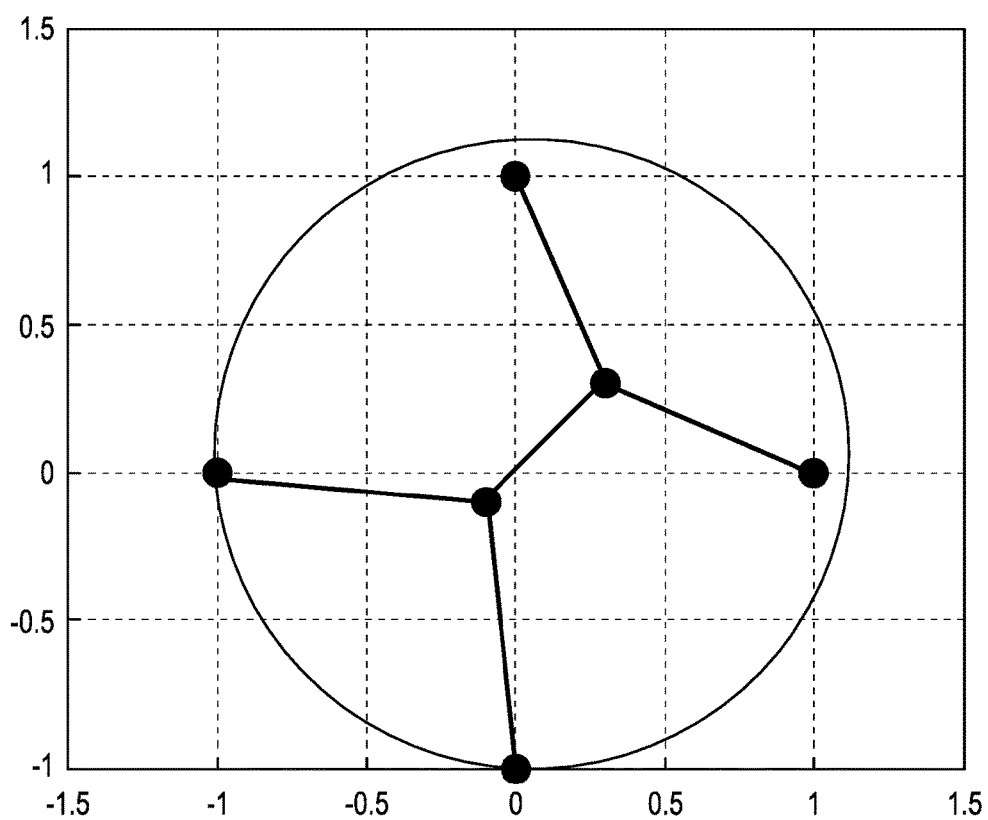
FIG. 6 illustrates a graphical representation of a circle, added to the system shown in FIGS. 1-2, which shows the estimated network area determined at one of the sensor nodes of FIGS. 1-2 after performing the stochastic gradient descent and distributed radius estimation to iteration 5000 to estimate the network area.

FIG. 6 illustrates a graphical representation of a circle, added to the system shown in FIG. 2, which shows the estimated network area determined at node 1 after performing the stochastic gradient descent and distributed radius estimation to iteration 5000 to estimate the network area. These results are based on stopping Phase I at iteration time $t^*=5000$. Based on the estimated center and radius, the estimate of the network area is obtained at the nodes.

Figure 7A:
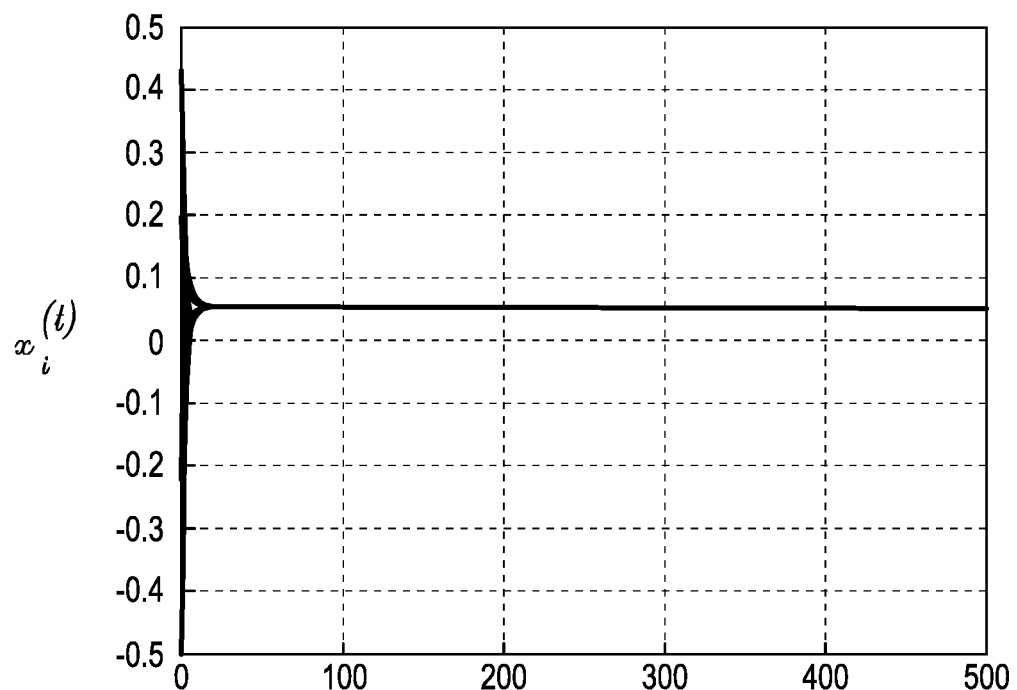
FIG. 7A illustrates a graphical plot of the estimate of the x coordinate value of center O at all nodes i of the system of FIGS. 1-2 versus iteration t using the diffusion adaptation approach.
Figure 7B:
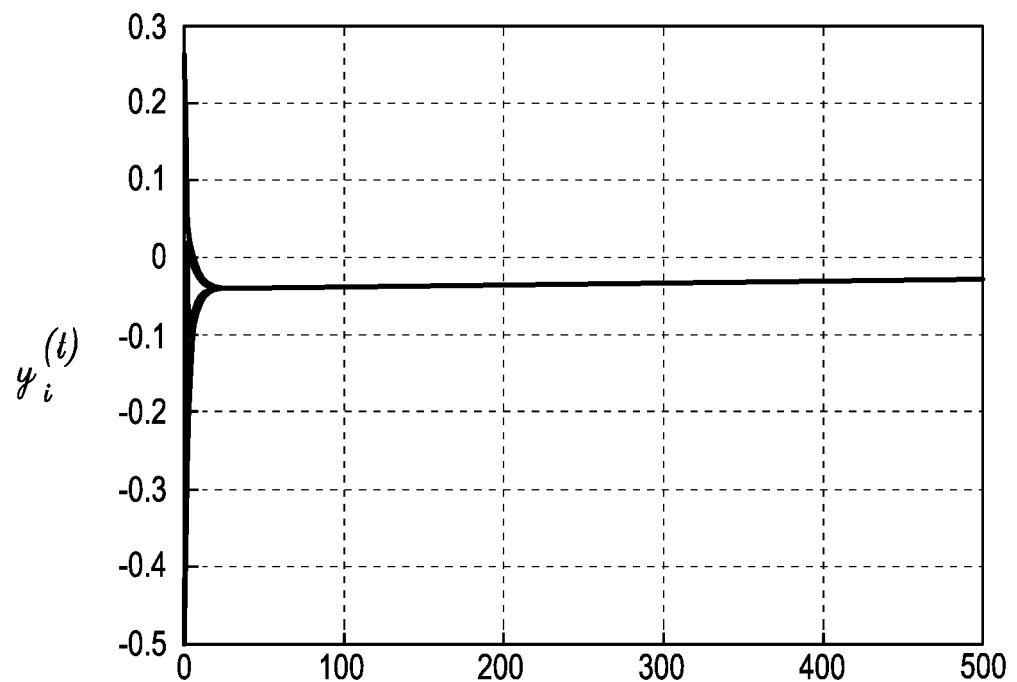
FIG. 7B shows a graphical plot of the estimate the y coordinate value of center O at all nodes i of the system of FIGS. 1-2 versus iteration t using the diffusion adaptation approach.

FIGS. 7A and 7B illustrate results of performing distributed center estimation using the diffusion adaptation approach, described above. The 2-D WSN with N=6 nodes as shown system 100 in FIG. 1 is considered in this simulation. The locations of the nodes are shown in FIG. 2, and the center is at O(0,0) with radius r=1. To estimate the center, performing distributed center estimation using the diffusion adaptation approach is performed. The initial states at nodes $\omega_i^{(0)}=[x_i(0) y_i(0)]^T$ are set to be uniformly distributed, $\mathcal{U}(-0.5,0.5)$. The descent step size $\mu=10^{-4}$ and the soft-max parameter $\beta=1$. The coefficients $c_{j,i}$ and $a_{j,i}$ are set based on degree of nodes:

$$c_{j,i} = a_{j,i} = \begin{cases} \frac{1}{d_i+1}, & \text{if } j \in \mathbb{N}_i \\ 0, & \text{otherwise} \end{cases} \quad (21)$$

Specifically, FIG. 7A illustrates a graphical plot of the estimate of the x coordinate value of center O at all nodes i versus iteration t using the diffusion adaptation approach. FIG. 7B illustrates a graphical plot of the estimate the y coordinate value of center O at all nodes i versus iteration t using the diffusion adaptation approach. The results shown in FIGS. 7A and 7B illustrate that the estimate at the nodes converge towards the center of the network when the iteration time t is large.

Figure 8:
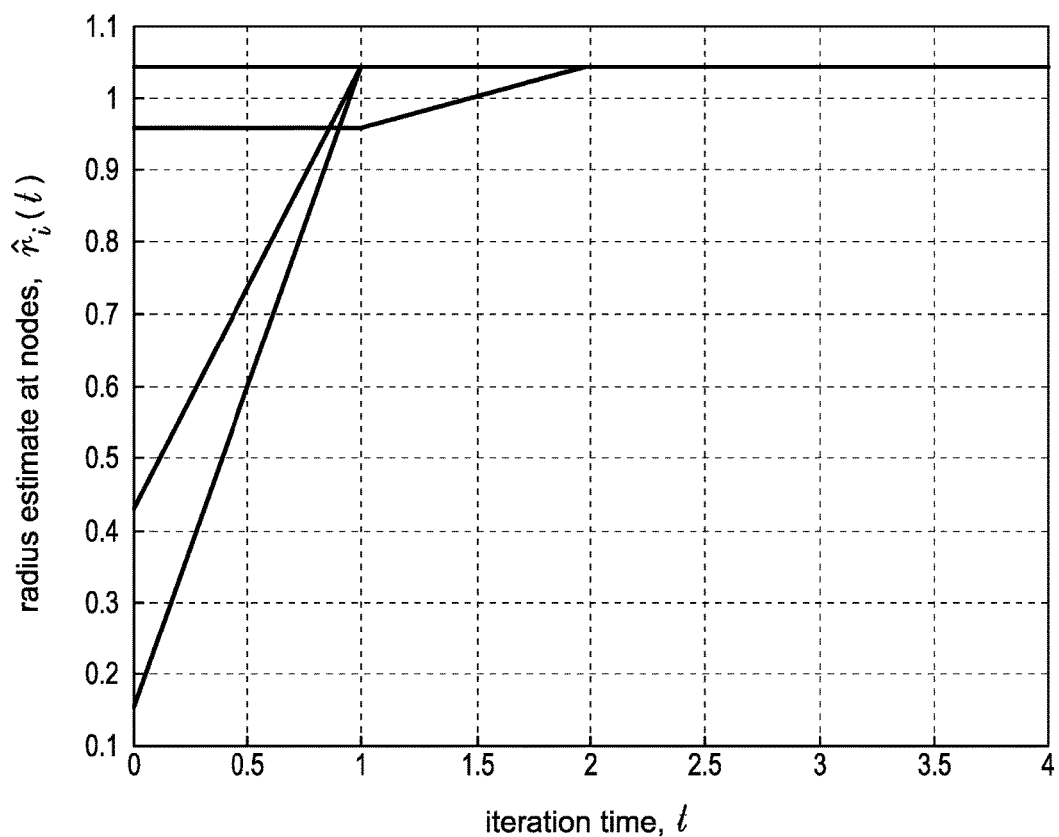
FIG. 8 illustrates a graphical plot of the radius estimate $\hat{r}_i(t)$ versus iteration t when performing the max consensus for radius estimation at all of the nodes i of the system of FIGS. 1-2 after performing diffusion adaptation to obtain the center.

FIG. 8 illustrates a graphical plot of the radius estimate $\hat{r}_i(t)$ versus iteration t when performing the max consensus for radius estimation at all of the nodes i, after performing diffusion adaptation to obtain the center. Distances from the nodes to the estimated centers are calculated at the nodes and set as initial values at the nodes for max consensus. FIG. 8 shows the max consensus radius estimation process. Specifically, FIG. 8 shows that consensus is reached in 3 iterations and the estimated radius $\hat{r}=1.045$.

Figure 9:
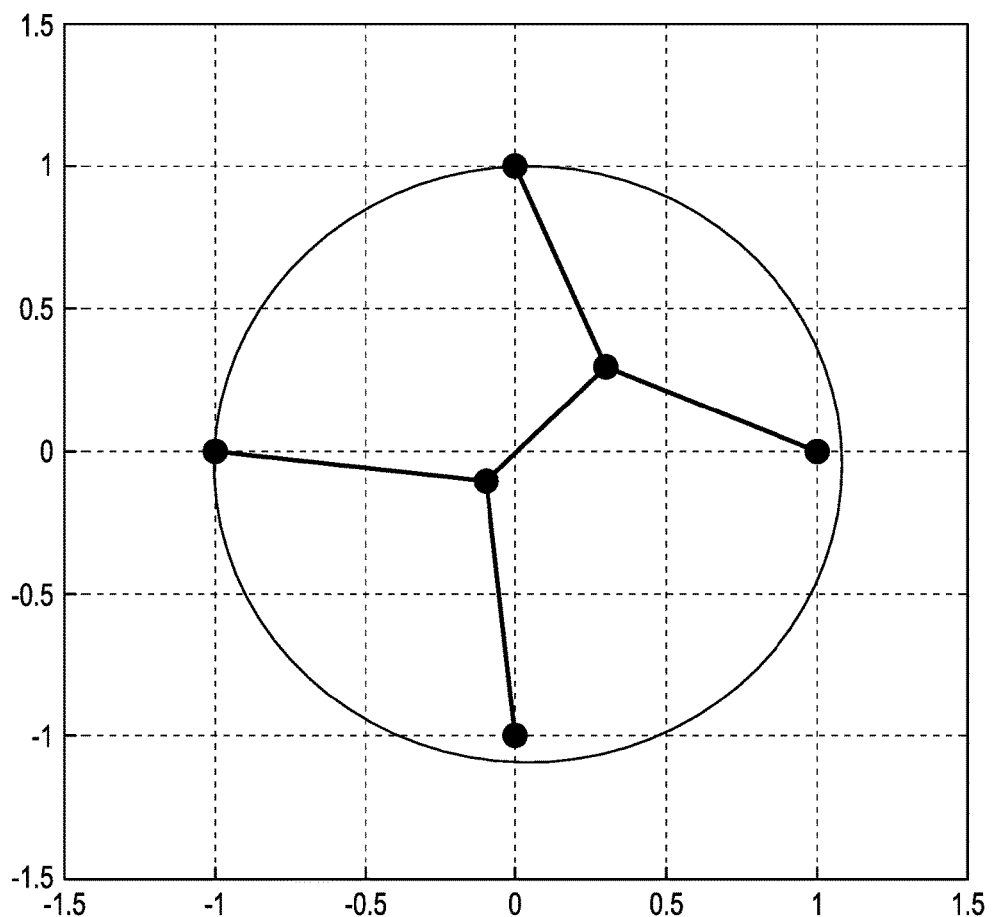
FIG. 9 illustrates a graphical representation of a circle, added to the system shown in FIG. 2, which shows the estimated network area determined at one of the sensor nodes of FIGS. 1-2 after performing the diffusion adaptation and distributed radius estimation to iteration 500 to estimate the network area.

FIG. 9 illustrates a graphical representation of a circle, added to the system shown in FIG. 2, which shows the estimated network area determined at node 1 after performing the diffusion adaptation and distributed radius estimation to iteration 500 to estimate the network area. Center estimation process is set to stop at $t^*=500$. Based on the estimated center and radius, an estimate of the network coverage region is obtained at nodes.

Discussion

The values of the design parameters, such as $\beta$, $\eta$, and the initial values $(x^{(0)}, y^{(0)})$ can affect the performance of the algorithm. Regarding the soft-max approximation parameter, $\beta$, Equation (2) indicates that larger $\beta$ values can result in more accurate max approximations from Equations (6) to (9). However, large $\beta$ values also can make the value of the objective function in Equation (9) very large, because an exponential function is used, which can affect convergence rates.

The initial values $(x^{(0)}, y^{(0)})$ and step size $\eta$ can affect the convergence rate of the stochastic gradient descent. In wireless sensor networks, average consensus can be used to choose $(x^{(0)}, y^{(0)})$. The nodes can first run average consensus on their x and y coordinate values, and the average consensus results can be used as the initial starting point of the network center estimation algorithm. This is because in many network structures, such as random graph or uniformly distributed network, the average location is close to the center. The step size $\eta$ also can affect the convergence speed of the algorithm.

In many embodiments, the systems and methods described herein can include a distributed wireless sensor network including a plurality of sensor nodes, without a fusion center. Each sensor node in the network can knows its own location, but not the location of the other nodes. Each sensor can keep a single state and the sensor nodes can update their states by exchanging their states with their neighbors. The network area can be defined to be a circular region in 2-D case and a sphere shape region in 3-D case. Estimating the area of a network can involve locating the center and calculating the radius, which can be performed by performing a distributed convex optimization in Phase I, described above, and the radius can be calculated distributively in Phase II.

In several embodiments, the center of the network region can be estimated in Phase I. In many embodiments, the center estimation phase can use a soft-max approximation to formulate the center estimation problem as a convex optimization problem. The original center estimation can be described as the optimization problem in Equation (6), such that the radius is defined to be the maximum distance between nodes and center, and the area of the covering circle is minimized if the radius is minimized. However, the formulation in Equation (6) is not differential and cannot be solved distributively, so the log-sum-exponential soft-max approximation function can be used to approximate the max term in Equation (6) to make the center estimation problem to be a convex optimization problem in a summation form as in Equation (8). Distributed optimization algorithms, such as stochastic gradient descent or diffusion adaptation can be used for distributed estimation of the center in Phase I.

In many embodiments, after all the nodes obtain the estimate of the center, max consensus can be used for distributed radius calculation in Phase II. In many embodiments, each node can first compute its distance to the estimated center. The radius, which is the maximum distance, can then be computed using distributed max consensus, in which the nodes exchange data with their neighbors and keep the maximum received data. In several embodiments, after all the nodes obtain the estimate of the center and radius, the network area can be obtained.

The systems and methods described herein beneficially can perform center and area estimation for a network in a fully distributed manner, such as without a fusion center or other centralized process. The distributed manner in which the algorithm is performed can advantageously involve communications between nodes and neighboring nodes, without other communications, which can beneficially be result in communications that are more robust to link failure and that saves transmission power.

In many embodiments, once the center, radius, and/or coverage area has been estimated, one or more pieces of such information can be stored in the sensor nodes, and/or transmitted, either immediately or at a later time, from one or more of the sensor nodes to one or more other systems. In a number of embodiments, this information can be displayed and/or otherwise used by such systems. The systems and methods described herein advantageously can be used in various applications. For example, detecting the coverage area and center can be helpful for deciding the border of a wireless sensor network, and, in some embodiments, can be used in border surveillance applications, for example. The information about the network center location also can be helpful for adding a service center (e.g., a fusion center) in a network. Moreover, by putting the sensors on animals and running the algorithm periodically, the movement of species can be tracked.

In many embodiments, the coverage area estimation can be fully distributed. The nodes can converge to an accurate estimate of the network center and coverage area with local communications with neighbors. Nodes do not need to be labeled. In several embodiments, the network coverage area can be defined to be the smallest circle that covers all the sensor nodes in 2-D case, and smallest sphere in 3-D case. The network coverage area can be characterized by the center and radius of the circle or sphere. The algorithm can include two Phases. In Phase I, the center can be estimated using distributed optimization. In Phase II, the radius can be calculated using distributed max consensus.

In a number of embodiments, in Phase I, the center of the smallest covering circle can be estimated at the nodes. The area of the covering circle can be proportional to the radius, and the radius can be defined to be the largest distance from sensors nodes to the center. Therefore, the center location estimation can be formulated as the optimization problem in Equation (6). However, the formulation in Equation (6) is not differentiable and cannot be solved in a distributed network. Therefore, the soft-max function can be used to approximate the objective function, and the network center estimation problem can be formulated as a convex optimization problem with a summation form as shown in Equation (8). The objective function can be proved to be convex and differentiable. The summation form of the new objective function can enable use of the stochastic gradient descent method to solve the problem in a fully distributed way.

The stochastic gradient descent-based distributed center estimation algorithm can be used to solve the convex optimization problem in Equation (8) for estimating the center distributively. At each iteration time, a single sensor node can be active and updating the center estimate using its local gradient information. Then, the active node can randomly choose one of its neighbors and passes the estimate to it. The chosen node becomes an active node, while the source node can turn inactive. The active node can repeatedly update the center estimation and pass data until all nodes obtain a reasonable estimate of the center location.

At the beginning of the algorithm, first a starting node is selected with a starting initial state value. Then at each iteration, the active node can update its state, e.g., the estimated x and y value based on the state at previous iteration time and the local gradient information. The update of the state of the active node at iteration time (t+1) is described herein.

In other embodiments, the diffusion adaptation-based distributed optimization algorithm described here can be used to distributively estimate the center of the network. All the nodes in the sensor network can broadcast their states and update the states based on received data from their neighbors. The algorithm can be fully distributed in the sense that each node is communicating only with its neighbors at each iteration time.

In many embodiments, at the beginning of the diffusion adaptation-based algorithm, each node can have an initial state value $\omega_i(0)$. Then at each iteration, each node can perform the following two step update: each node first can update an intermediate value vector, $\psi_i$ based on the its own state at previous time and the gradient information from all of its neighbors; then in the second step, each node can update its state (estimated center, $\omega_i$) based on the intermediate value vector from all of its neighbors.

In several embodiments, stopping criteria for gradient descent and diffusion adaptation can be used to decide when to terminate the distributed center estimation algorithm. For example, the algorithm can be stopped when the difference between the "new" update and the "old" state is very small (smaller than a pre-defined threshold) during a predefined time period. Other reasonable termination criteria can include stopping the algorithm when the norm of the gradient is smaller than a predefined threshold value.

In many embodiments, in Phase II, max consensus can be used to estimate the radius of the network coverage area. After consensus is reached in Phase I and all nodes have a reasonable estimate of the center, Phase II can proceed with the nodes first computing their distances to the estimated centers. The calculated distances can be set as the initial state values at nodes. The radius, which is the maximum distance, can be calculated in a distributive manner using max consensus. Max consensus with a max operator can be used in the algorithm, in which each node broadcasts its state to its neighbors at each iteration, and each node keeps the maximum received state. Max consensus also can be done in a pairwise way, in which a node randomly chooses one of its neighbors, and the two nodes exchange data with each other and keep the maximum out of the data shared and received.

In several embodiments, the network coverage region can be decided from the center and radius estimation results. In a number of embodiments, the soft-max design parameter, $\beta$ can affect the performance of the algorithm. Larger $\beta$ can result in more accurate max approximation in Equation (8). Therefore, more accurate center estimation can be obtained when $\beta$ is large.

Figure 10:
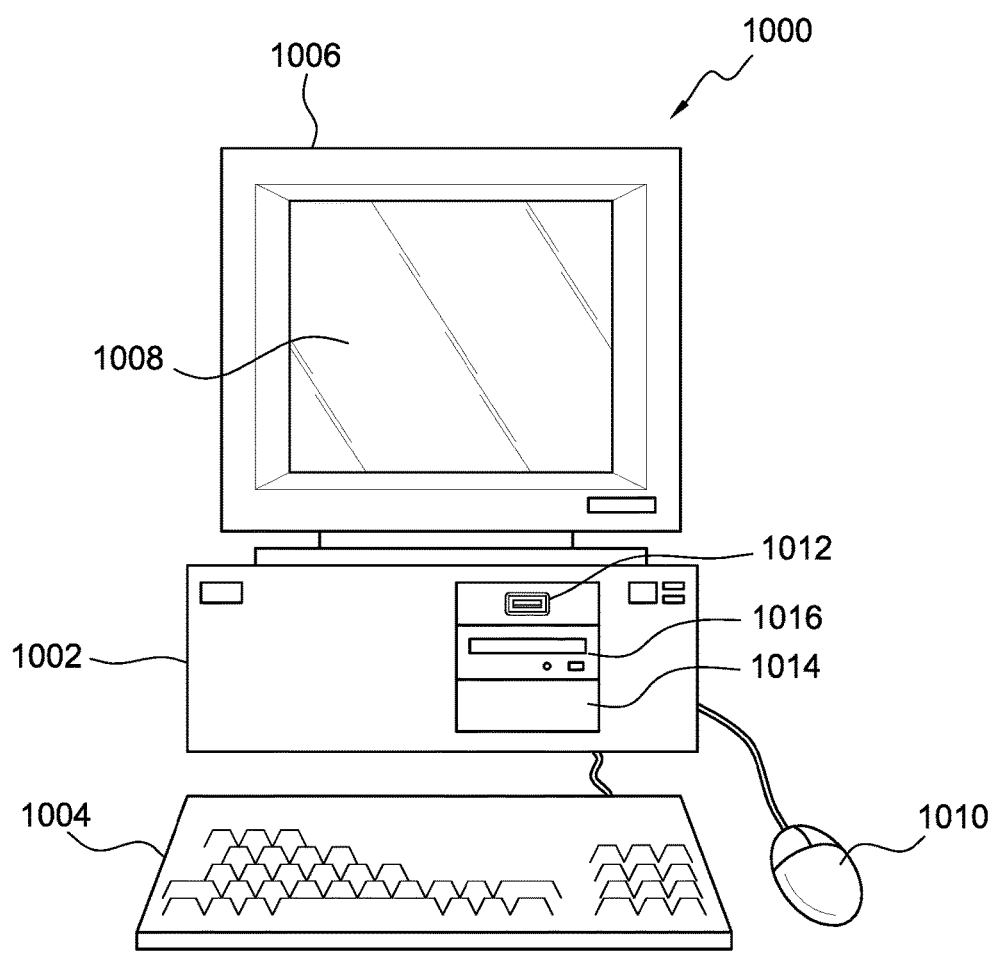
FIG. 10 illustrates a computer system that is suitable for implementing an embodiment of the sensor nodes of FIG. 1.
Figure 11:
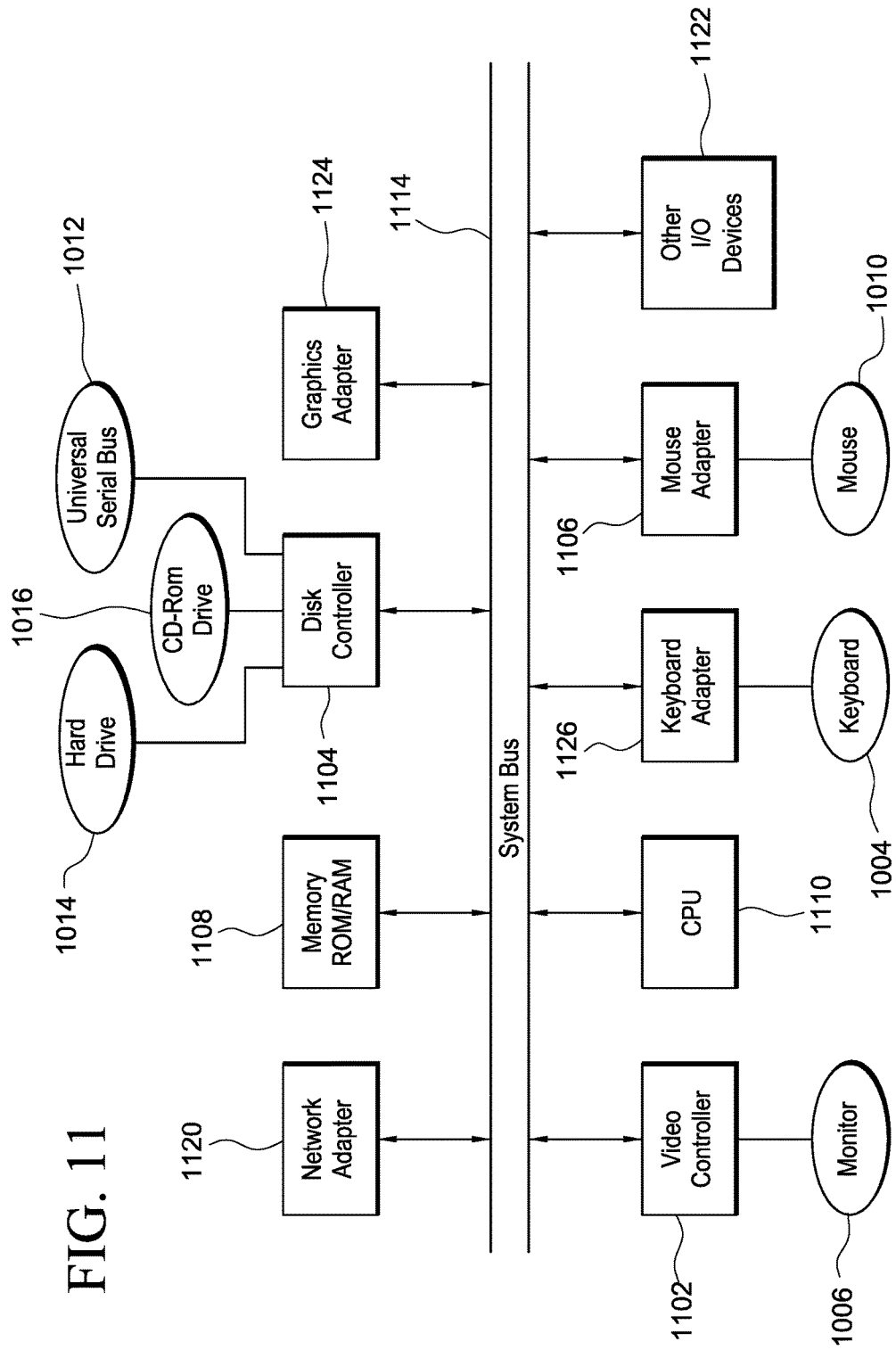
FIG. 11 illustrates a representative block diagram of an example of the elements included in the circuit boards inside a chassis of the computer system of FIG. 10.

Turning to the next drawing, FIG. 10 illustrates an exemplary embodiment of computer system 1000, all of which or a portion of which can be suitable for implementing sensor nodes 111-116 (FIG. 1), method 1200 (FIG. 12, described below), and/or the techniques described here. As an example, a different or separate one of chassis 1002 (and its internal components) can be suitable for implementing the techniques described herein. Furthermore, one or more elements of computer system 1000 (e.g., refreshing monitor 1006, keyboard 1004, and/or mouse 1010, etc.) can also be appropriate for implementing the techniques described herein. Computer system 1000 comprises chassis 1002 containing one or more circuit boards (not shown), Universal Serial Bus (USB) port 1012, Compact Disc Read-Only Memory (CD-ROM) and/or Digital Video Disc (DVD) drive 1016, and hard drive 1014. A representative block diagram of the elements included on the circuit boards inside chassis 1002 is shown in FIG. 11. A central processing unit (CPU) 1110 in FIG. 11 is coupled to system bus 1114 in FIG. 11. In various embodiments, the architecture of CPU 1110 can be compliant with any of a variety of commercially distributed architecture families.

Continuing with FIG. 11, system bus 1114 also is coupled to memory storage unit 1108, where memory storage unit 1108 comprises both read only memory (ROM) and random access memory (RAM). Non-volatile portions of memory storage unit 1108 or the ROM can be encoded with a boot code sequence suitable for restoring computer system 1000 (FIG. 10) to a functional state after a system reset. In addition, memory storage unit 1108 can comprise microcode such as a Basic Input-Output System (BIOS). In some examples, the one or more memory storage units of the various embodiments disclosed herein can comprise memory storage unit 1108, a USB-equipped electronic device, such as, an external memory storage unit (not shown) coupled to universal serial bus (USB) port 1012 (FIGS. 10-11), hard drive 1014 (FIGS. 10-11), and/or CD-ROM or DVD drive 1016 (FIGS. 10-11). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 1110.

In the depicted embodiment of FIG. 11, various I/O devices such as disk controller 1104, graphics adapter 1124, video controller 1102, keyboard adapter 1126, mouse adapter 1106, network adapter 1120, and other I/O devices 1122 can be coupled to system bus 1114. Keyboard adapter 1126 and mouse adapter 1106 are coupled to keyboard 1004 (FIGS. 10-11) and mouse 1010 (FIGS. 10-11), respectively, of computer system 1000 (FIG. 10). While graphics adapter 1124 and video controller 1102 are indicated as distinct units in FIG. 11, video controller 1102 can be integrated into graphics adapter 1124, or vice versa in other embodiments. Video controller 1102 is suitable for refreshing monitor 1006 (FIGS. 10-11) to display images on a screen 1008 (FIG. 10) of computer system 1000 (FIG. 10). Disk controller 1104 can control hard drive 1014 (FIGS. 10-11), USB port 1012 (FIGS. 10-11), and CD-ROM drive 1016 (FIGS. 10-11). In other embodiments, distinct units can be used to control each of these devices separately.

In some embodiments, network adapter 1120 can comprise and/or be implemented as a WNIC (wireless network interface controller) card (not shown) plugged or coupled to an expansion port (not shown) in computer system 1000 (FIG. 10). In other embodiments, the WNIC card can be a wireless network card built into computer system 1000 (FIG. 10). A wireless network adapter can be built into computer system 1000 by having wireless communication capabilities integrated into the motherboard chipset (not shown), or implemented via one or more dedicated wireless communication chips (not shown), connected through a PCI (peripheral component interconnector) or a PCI express bus of computer system 1000 (FIG. 10) or USB port 1012 (FIG. 10). In other embodiments, network adapter 1120 can comprise and/or be implemented as a wired network interface controller card (not shown).

Although many other components of computer system 1000 (FIG. 10) are not shown, such components and their interconnection are well known to those of ordinary skill in the art. Accordingly, further details concerning the construction and composition of computer system 1000 and the circuit boards inside chassis 1002 (FIG. 10) are not discussed herein.

When computer system 1000 in FIG. 10 is running, program instructions stored on a USB-equipped electronic device connected to USB port 1012, on a CD-ROM or DVD in CD-ROM and/or DVD drive 1016, on hard drive 1014, or in memory storage unit 1108 (FIG. 11) are executed by CPU 1110 (FIG. 11). A portion of the program instructions, stored on these devices, can be suitable for carrying out at least part of the techniques described herein. In various embodiments, computer system 1000 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 1000, and can be executed by CPU 1110. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 1000 is illustrated as a desktop computer in FIG. 10, there can be examples where computer system 1000 may take a different form factor while still having functional elements similar to those described for computer system 1000. In some embodiments, computer system 1000 may comprise a single computer, a single server, or a cluster or collection of computers or servers, or a cloud of computers or servers. Typically, a cluster or collection of servers can be used when the demand on computer system 1000 exceeds the reasonable capability of a single server or computer. In certain embodiments, computer system 1000 may comprise a portable computer, such as a laptop computer. In certain other embodiments, computer system 1000 may comprise a mobile device, such as a smartphone. In certain additional embodiments, computer system 1000 may comprise an embedded system, such as part of a small sensor device.

Figure 12:
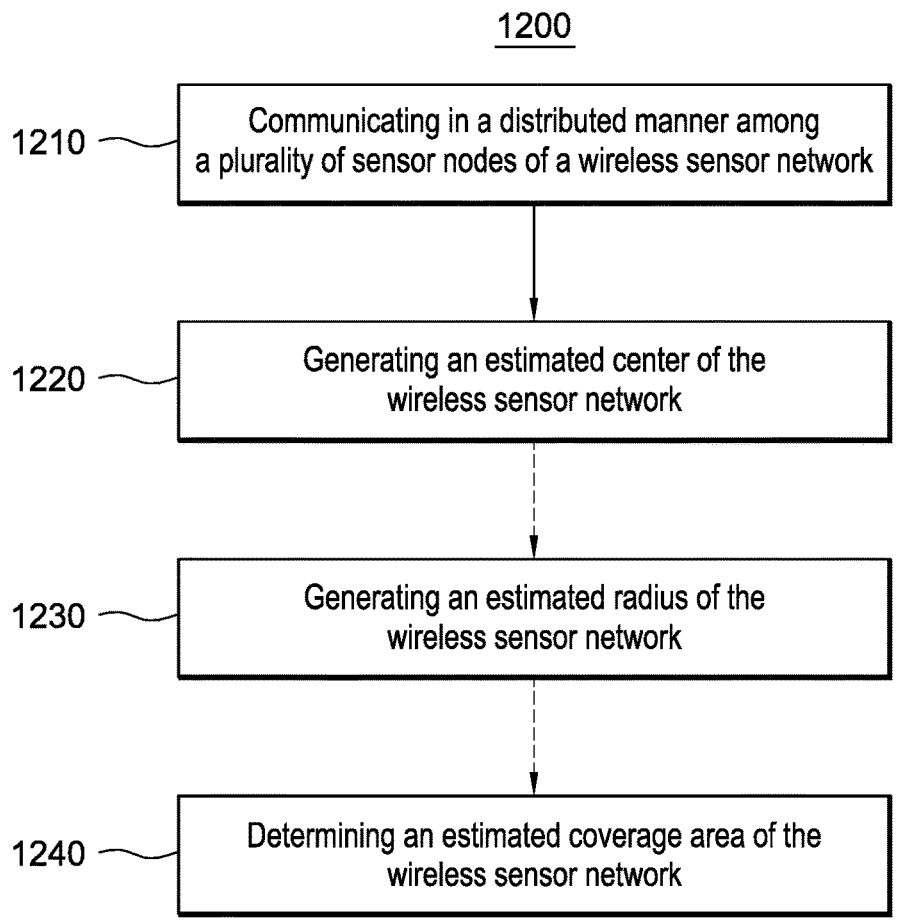
FIG. 12 illustrates a flowchart for a method, according to an embodiment.

Turning ahead in the drawings, FIG. 12 illustrates a flow chart for a method 1200. In some embodiments, method 1200 can be a method of performing distributed network center and area estimation. Method 1200 is merely exemplary and is not limited to the embodiments presented herein. Method 1200 can be employed in many different embodiments or examples not specifically depicted or described herein. In some embodiments, the procedures, the processes, and/or the activities of method 1200 can be performed in the order presented. In other embodiments, the procedures, the processes, and/or the activities of method 1200 can be performed in any suitable order. In still other embodiments, one or more of the procedures, the processes, and/or the activities of method 1200 can be combined or skipped.

In many embodiments, method 1200 and/or one or more of the activities of method 1200 can be implemented by system 100 (FIG. 1). In these or other embodiments, one or more of the activities of method 1200 can be implemented as one or more computing instructions configured to run at one or more processors and configured to be stored at one or more non-transitory computer readable media. Such non-transitory computer readable media can be part of a computer system such as system 100 (FIG. 1). The processor(s) can be similar or identical to the processor(s) described above with respect to computer system 1000 (FIG. 10).

Referring to FIG. 12, method 1200 can include a block 1210 of communicating in a distributed manner among a plurality of sensor nodes of a wireless sensor network for a first plurality of iterations until a final iteration of the first plurality of iterations when a predetermined stopping condition is satisfied. The wireless sensor network can be similar or identical to system 100 (FIG. 1). The sensor nodes can be similar or identical to sensor nodes 111-116 (FIG. 1). In many embodiments, each of the plurality of sensor nodes can include a signal receiver, one or more processors, and/or a transmitter. The processor can be similar or identical to CPU 1110 (FIG. 11). The transmitter can be a conventional transmitter for wireless communications, and the signal receiver can be a conventional signal receiver for wireless communications. The wireless communications can involve any suitable conventional wireless communications protocols.

In many embodiments, the signal receiver can be configured to receive intermediate information from at least one of one or more neighboring nodes of the plurality of sensor nodes. In a number of embodiments, the one or more processors can be configured to receive the intermediate information and update the intermediate information based on a soft-max approximation function. In several embodiments, the transmitter can be configured to send the intermediate information, as updated, to at least one of the one or more neighboring nodes of the plurality of sensor nodes. In various embodiments, each respective set of the one or more neighboring nodes that are associated with each respective one of the plurality of sensor nodes can be determined based on a local communication range of each respective one of the plurality of sensor nodes. For example, edges 131-135 (FIG. 1) can represent connections between neighboring nodes for local communication. In many embodiments, for each sensor node, the sensor node can communicate with only a subset of the sensor nodes in the wireless sensor network.

In some embodiments, for each sensor node of the plurality of sensor nodes, the sensor node can store local location coordinates for the sensor node. The local location coordinates can be obtained by the sensor node from a GPS system or can be entered into the sensor node when the sensor node is placed in the location. In many embodiments, for each sensor node of the plurality of sensor nodes, the sensor node can be devoid of receiving location coordinates for any other of the plurality of sensor nodes. In several embodiments, the wireless sensor network can be devoid of a fusion center, such as a center that receives communication from each and every one of the sensor nodes and compiles the information received.

In a number of embodiments, the predetermined stopping condition can be based on a delta of updates to the intermediate information being within a predetermined amount across the plurality of sensor nodes of the wireless sensor network for a predetermined amount of iterations and/or a predetermined amount of time. For example, if the change (delta) in the intermediate information from before update to after update is less than a predetermined amount for a certain predetermined number of iterations (e.g., for at least 10, 20, or 50 iterations), the stopping condition can be satisfied. In other embodiments, the stopping condition can be based on a predetermined number of iterations (e.g., performing 5000 iterations), or a predetermined amount of time (e.g., 60 seconds). In further embodiments, the stopping condition can be similar or identical to the stopping criteria described above. The final iteration can be the last iteration that caused the stopping condition to be satisfied.

In some embodiments, the wireless sensor network can be 3-D. In other embodiments, the wireless sensor network can be 2-D. When the wireless sensor network if 2-D, the soft-max approximation function can be $e^{\beta\{(a_i-x_i(t))^2+(b_i-y_i(t))^2\}}$, where $(a_i, b_i)$ are the local location coordinates for sensor node i, $\beta$ is a design parameter, and $(x_i(t),y_i(t))$ is an intermediate center estimate at iteration t.

In several embodiments, method 1200 also can include a block 1220 of generating an estimated center of the wireless sensor network based on the intermediate information updated in the final iteration. For example, the estimated center can be an estimate of center 120 (FIG. 1).

In some embodiments, the plurality of sensor nodes can perform stochastic gradient descent when communicating in the distributed manner. In such embodiments, a single sensor node of the plurality of sensor nodes can be active at each of the first plurality of iterations, and the intermediate information determined at the single sensor node that is active can represent an intermediate center estimate of the wireless sensor network. During an iteration of the first plurality of iterations, the single sensor node of the plurality of sensor nodes that is active first can receive the intermediate center estimate from a single one of the one or more neighboring nodes of the plurality of sensor nodes associated with the single sensor node. The single sensor node that is active next can update the intermediate center estimate. The single sensor node that is active also can randomly select a single one of the one or more neighboring nodes of the plurality of sensor nodes as a destination sensor node. The single sensor node additionally can send the intermediate center estimate, as updated, to the destination sensor node, to cause the single sensor node to become inactive, and the destination sensor node to become active.

In other embodiments, the plurality of sensor nodes perform diffusion adaptation when communicating in the distributed manner. In many embodiments, during an iteration of the first plurality of iterations, all of the plurality of sensor nodes can be active, and each active sensor of the plurality of sensor nodes can receive the intermediate information from all of the one or more neighboring nodes associated with the active sensor and sends the intermediate information, as updated, to all of the one or more neighboring nodes associated with the active sensor. For example, as described above, each of the sensor nodes can have an initial state value $\omega_i(0)$. Then at each iteration, each node can perform the following two step update: each node first can update an intermediate value vector, $\psi_i$ based on the its own state at previous time and the gradient information from all of its neighbors; then in the second step, each node can update its state (estimated center, $\omega_i$) based on the intermediate value vector from all of its neighbors.

In a number of embodiments, method 1200 additionally can include a block 1230 of generating an estimated radius of the wireless sensor network based on the estimated center of the wireless sensor network using distributed communication among the plurality of nodes for a second plurality of iterations. The second plurality of iterations can occur in Phase II after the first plurality of iterations in Phase I. In some embodiments, a quantity of the second plurality of iterations can be the same as a quantity of the first plurality of iterations. In other embodiments, a quantity of the second plurality of iterations can be different from a quantity of the first plurality of iterations. In a number of embodiments, block 1230 of generating an estimated radius of the wireless sensor network based on the estimated center of the wireless sensor network using distributed communication among the plurality of nodes for a second plurality of iterations can involve generating the estimated radius of the wireless sensor network using max consensus across the second plurality of iterations of a distance from each of the plurality of sensor nodes to the estimated center of the wireless sensor network. For example, the max consensus can be performed based on the distributed radius estimation technique described above.

In several embodiments, method 1200 further can include a block 1240 of determining an estimated coverage area of the wireless sensor network based on the estimated radius. For example, block 1240 of determining an estimated coverage area of the wireless sensor network based on the estimated radius can involve determining the absolute area or volume based simply on the radius of the circle (in the 2-D case) or the sphere (in the 3-D case), and/or can involve determining the regions that are within the circle or sphere, based on the estimated radius and the estimated center.

Although distributed network center and area estimation has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that any element of FIGS. 1-12 may be modified, and that the foregoing discussion of certain of these embodiments does not necessarily represent a complete description of all possible embodiments. For example, one or more of the procedures, processes, or activities of FIG. 12 may include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:
1. A wireless sensor network comprising:
a plurality of sensor nodes each comprising:
  a signal receiver configured to receive intermediate information from at least one of one or more neighboring nodes of the plurality of sensor nodes;
  one or more processors configured to receive the intermediate information and update the intermediate information based on a soft-max approximation function; and
  a transmitter configured to send the intermediate information, as updated, to at least one of the one or more neighboring nodes of the plurality of sensor nodes,
wherein:
  for each sensor node of the plurality of sensor nodes:
    the sensor node stores local location coordinates for the sensor node; and
    the sensor node is devoid of receiving location coordinates for any other of the plurality of sensor nodes;
  the plurality of sensor nodes are configured to communicate in a distributed manner for a first plurality of iterations until a final iteration of the first plurality of iterations when a predetermined stopping condition is satisfied;
  the plurality of sensor nodes are further configured to generate an estimated center of the wireless sensor network based on the intermediate information updated in the final iteration of the first plurality of iterations;
  the wireless sensor network is devoid of a fusion center;
  the plurality of sensor nodes are further configured to perform generating an estimated radius of the wireless sensor network based on the estimated center of the wireless sensor network using distributed communication among the plurality of sensor nodes for a second plurality of iterations; and
  generating the estimated radius of the wireless sensor network comprises:
    generating the estimated radius of the wireless sensor network using max consensus across the second plurality of iterations of a distance from each of the plurality of sensor nodes to the estimated center of the wireless sensor network.

2. The wireless sensor network of claim 1, wherein:
the plurality of sensor nodes are further configured to determine an estimated coverage area of the wireless sensor network based on the estimated radius.

3. The wireless sensor network of claim 1, wherein:
the plurality of sensor nodes are configured to perform stochastic gradient descent when communicating in the distributed manner;
a single respective sensor node of the plurality of sensor nodes is active at each of a respective one of the first plurality of iterations; and
the intermediate information determined at the single respective sensor node that is active represents an intermediate center estimate of the wireless sensor network.

4. The wireless sensor network of claim 3, wherein, during an iteration of the first plurality of iterations:
the single respective sensor node of the plurality of sensor nodes that is active receives the intermediate center estimate from a single respective one of the one or more neighboring nodes of the plurality of sensor nodes associated with the single respective sensor node;
the single respective sensor node that is active updates the intermediate center estimate;
the single respective sensor node that is active randomly selects a single respective one of the one or more neighboring nodes of the plurality of sensor nodes as a destination sensor node; and
the single respective sensor node sends the intermediate center estimate, as updated, to the destination sensor node, to cause the single respective sensor node to become inactive, and the destination sensor node to become active.

5. The wireless sensor network of claim 1, wherein:
the plurality of sensor nodes are configured to perform diffusion adaptation when communicating in the distributed manner; and
during an iteration of the first plurality of iterations:
all of the plurality of sensor nodes are active; and
each active sensor of the plurality of sensor nodes receives the intermediate information from all of the one or more neighboring nodes associated with the active sensor and sends the intermediate information, as updated, to all of the one or more neighboring nodes associated with the active sensor.

6. The wireless sensor network of claim 1, wherein:
the predetermined stopping condition is based on a delta of updates to the intermediate information being within a predetermined amount across the plurality of sensor nodes of the wireless sensor network for a predetermined amount of iterations.

7. The wireless sensor network of claim 1, wherein:
the wireless sensor network is two-dimensional; and
the soft-max approximation function is $e^{\beta\{(a_i-x_i(t))^2+(b_i-y_i(t))^2\}}$, where $(a_i, b_i)$ are the local location coordinates for sensor node i, $\beta$ is a design parameter, and $(x_i(t), y_i(t))$ is an intermediate center estimate at iteration t.

8. The wireless sensor network of claim 1, wherein:
each respective set of the one or more neighboring nodes that are associated with each respective one of the plurality of sensor nodes is determined based on a local communication range of each respective one of the plurality of sensor nodes.

9. A method comprising:
communicating in a distributed manner among a plurality of sensor nodes of a wireless sensor network for a first plurality of iterations until a final iteration of the first plurality of iterations when a predetermined stopping condition is satisfied, wherein each of the plurality of sensor nodes comprises a signal receiver configured to receive intermediate information from at least one of one or more neighboring nodes of the plurality of sensor nodes, one or more processors configured to receive the intermediate information and update the intermediate information based on a soft-max approximation function, and a transmitter configured to send the intermediate information, as updated, to at least one of the one or more neighboring nodes of the plurality of sensor nodes;
generating an estimated center of the wireless sensor network based on the intermediate information updated in the final iteration; and
generating an estimated radius of the wireless sensor network based on the estimated center of the wireless sensor network using distributed communication among the plurality of sensor nodes for a second plurality of iterations,
wherein:
for each sensor node of the plurality of sensor nodes:
the sensor node stores local location coordinates for the sensor node; and
the sensor node is devoid of receiving location coordinates for any other of the plurality of sensor nodes;
the wireless sensor network is devoid of a fusion center; and
generating the estimated radius of the wireless sensor network comprises:
generating the estimated radius of the wireless sensor network using max consensus across the second plurality of iterations of a distance from each of the plurality of sensor nodes to the estimated center of the wireless sensor network.

10. The method of claim 9 further comprising:
determining an estimated coverage area of the wireless sensor network based on the estimated radius.

11. The method of claim 9, wherein:
the plurality of sensor nodes perform stochastic gradient descent when communicating in the distributed manner;
a single respective sensor node of the plurality of sensor nodes is active at each of a respective one of the first plurality of iterations; and
the intermediate information determined at the single respective sensor node that is active represents an intermediate center estimate of the wireless sensor network.

12. The method of claim 11, wherein, during an iteration of the first plurality of iterations:
the single respective sensor node of the plurality of sensor nodes that is active receives the intermediate center estimate from a single respective one of the one or more neighboring nodes of the plurality of sensor nodes associated with the single respective sensor node;
the single respective sensor node that is active updates the intermediate center estimate;
the single respective sensor node that is active randomly selects a single respective one of the one or more neighboring nodes of the plurality of sensor nodes as a destination sensor node; and
the single respective sensor node sends the intermediate center estimate, as updated, to the destination sensor node, to cause the single respective sensor node to become inactive, and the destination sensor node to become active.

13. The method of claim 9, wherein:
the plurality of sensor nodes perform diffusion adaptation when communicating in the distributed manner; and
during an iteration of the first plurality of iterations:
   all of the plurality of sensor nodes are active; and
   each active sensor of the plurality of sensor nodes receives the intermediate information from all of the one or more neighboring nodes associated with the active sensor and sends the intermediate information, as updated, to all of the one or more neighboring nodes associated with the active sensor.

14. The method of claim 9, wherein:
the predetermined stopping condition is based on a delta of updates to the intermediate information being within a predetermined amount across the plurality of sensor nodes of the wireless sensor network for a predetermined amount of iterations.

15. The method of claim 9, wherein:
the wireless sensor network is two-dimensional; and
the soft-max approximation function is $e^{\beta\{(a_i-x_i(t))^2+(b_i-y_i(t))^2\}}$, where $(a_i, b_i)$ are the local location coordinates for sensor node i, $\beta$ is a design parameter, and $(x_i(t), y_i(t))$ is an intermediate center estimate at iteration t.

16. The method of claim 9, wherein:
each respective set of the one or more neighboring nodes that are associated with each respective one of the plurality of sensor nodes is determined based on a local communication range of each respective one of the plurality of sensor nodes.

\* \* \* \* \*